June 7, 1966  G. C. CURRIE, JR  3,254,470
MACHINE FOR PACKAGING ARTICLES
Filed Oct. 30, 1962  18 Sheets-Sheet 1
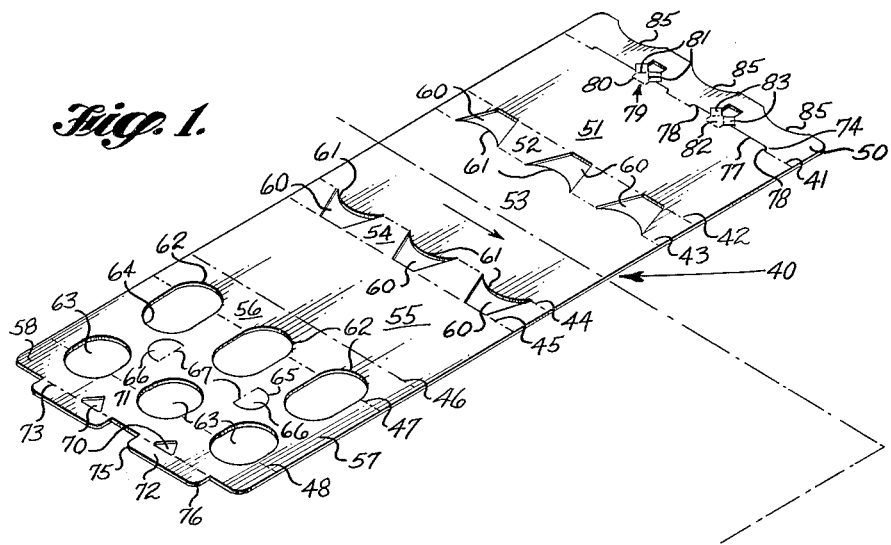
INVENTOR.
GROVER C. CURRIE, JR.
BY
ATTORNEYS June 7, 1966 G. C. CURRIE, JR 3,254,470
MACHINE FOR PACKAGING ARTICLES
Filed Oct. 30, 1962 18 Sheets-Sheet 2
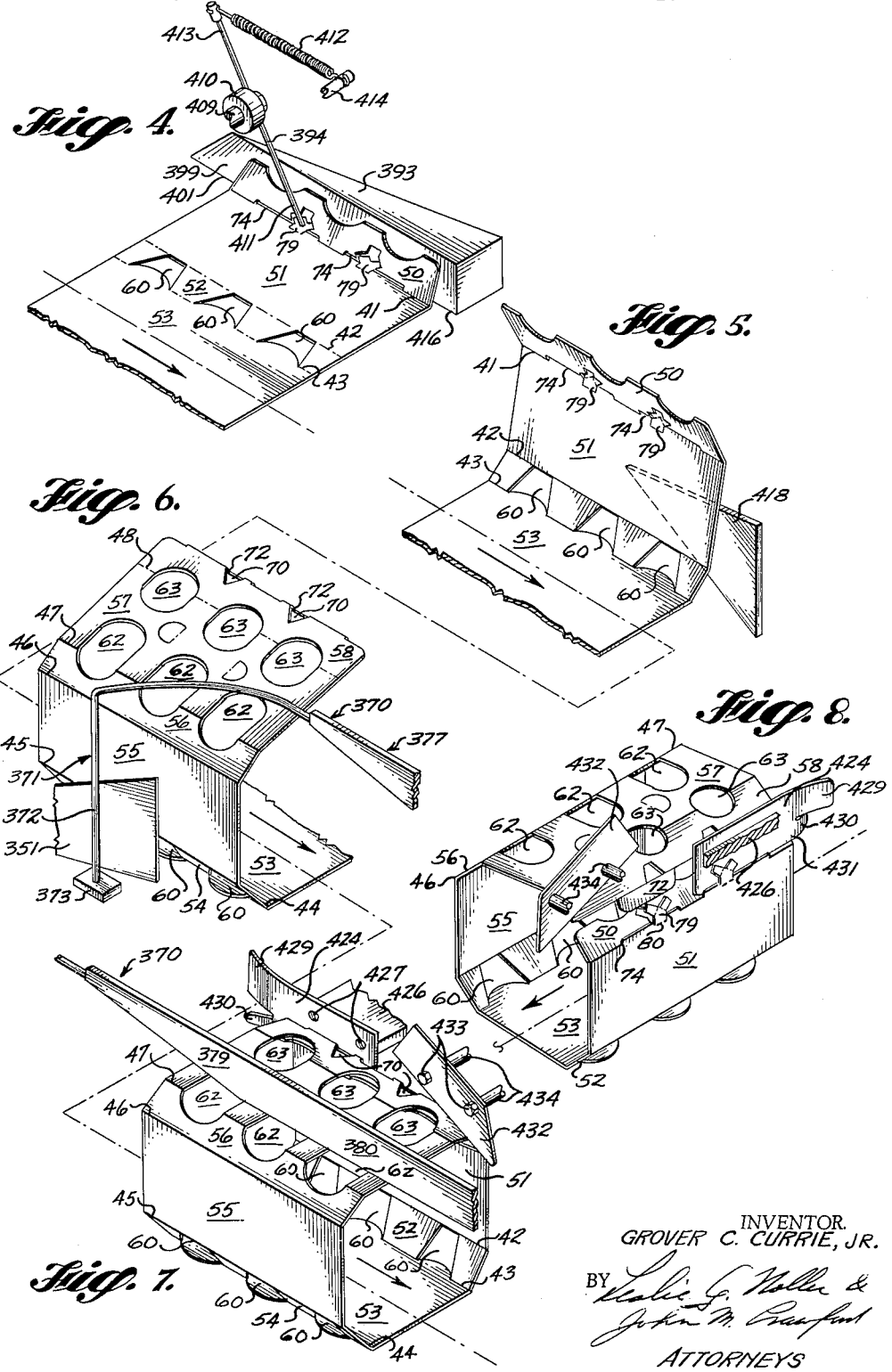
INVENTOR.
GROVER C. CURRIE, JR.
BY
ATTORNEYS

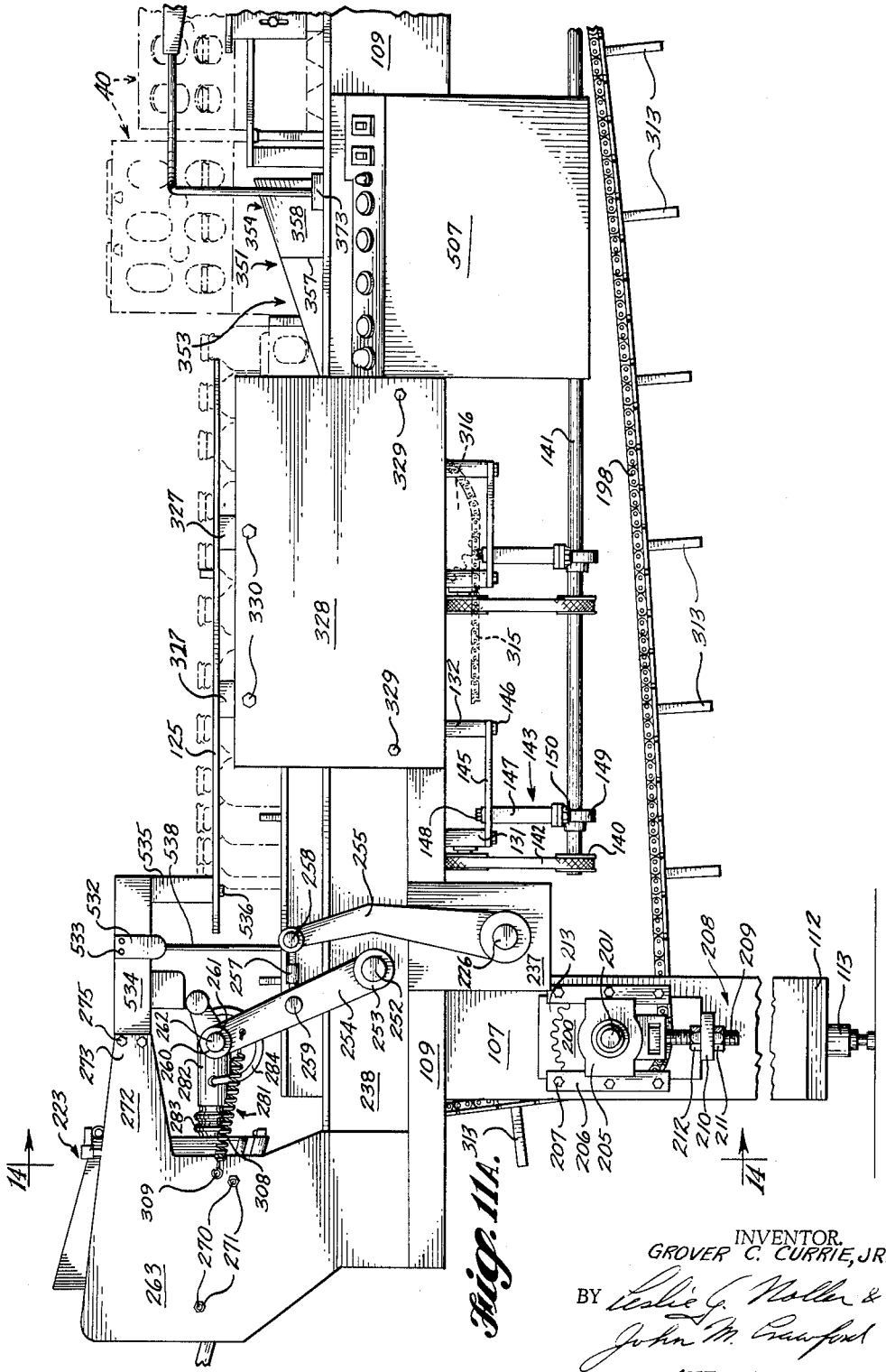

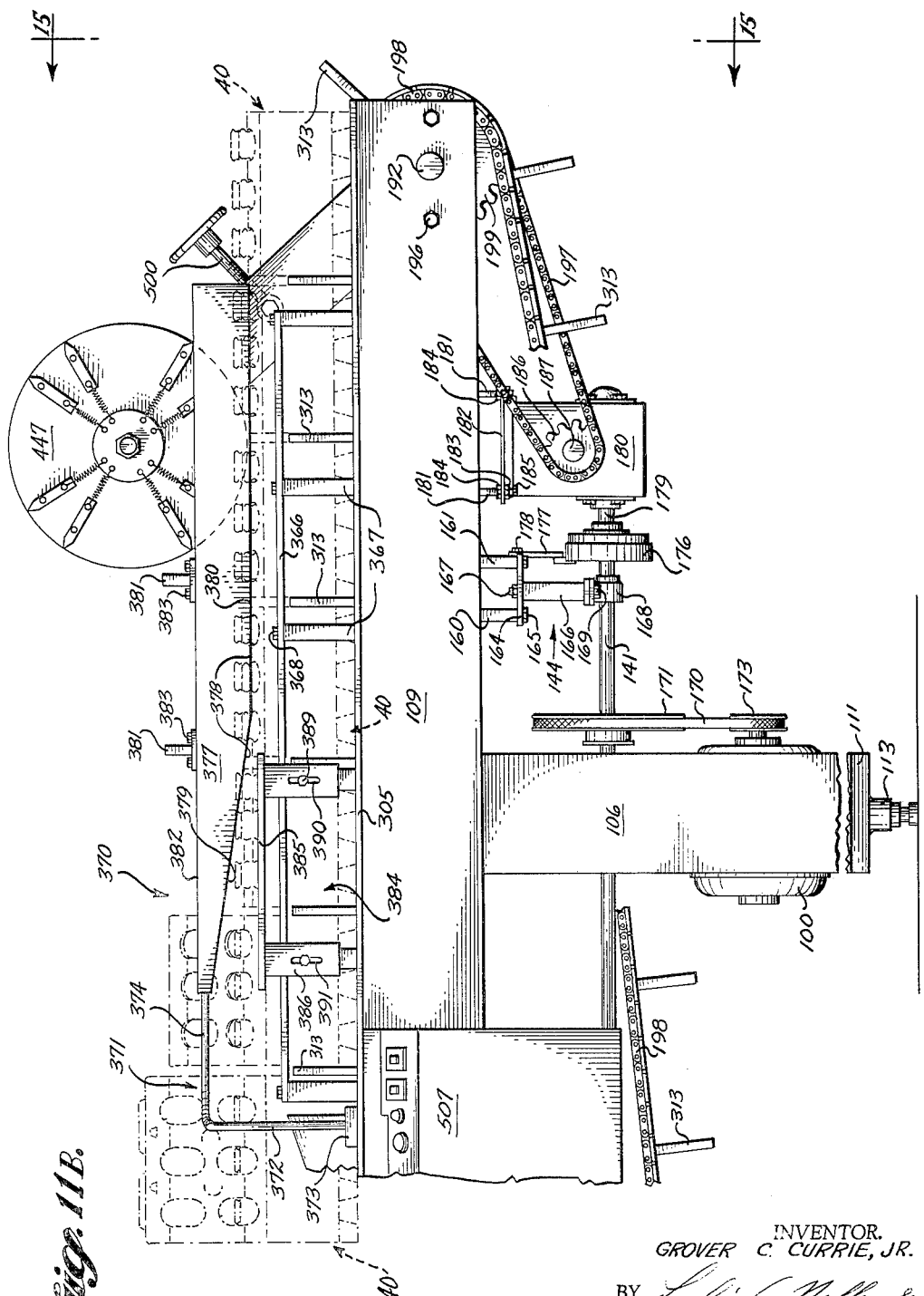

June 7, 1966  G. C. CURRIE, JR  3,254,470
MACHINE FOR PACKAGING ARTICLES
Filed Oct. 30, 1962  18 Sheets-Sheet 6

Fig. 12A.

INVENTOR.
GROVER C. CURRIE, JR.
BY
ATTORNEYS

June 7, 1966

G. C. CURRIE, JR 3,254,470

MACHINE FOR PACKAGING ARTICLES

Filed Oct. 30, 1962

INVENTOR.
GROVER C. CURRIE, JR.

BY

ATTORNEYS

June 7, 1966 G. C. CURRIE, JR 3,254,470
MACHINE FOR PACKAGING ARTICLES
Filed Oct. 30, 1962 18 Sheets-Sheet 8

Fig. 13A.

INVENTOR.
GROVER C. CURRIE, JR.
BY
ATTORNEYS

June 7, 1966 G. C. CURRIE, JR 3,254,470
MACHINE FOR PACKAGING ARTICLES
Filed Oct. 30, 1962 18 Sheets-Sheet 9

INVENTOR.
GROVER C. CURRIE, JR.
BY
ATTORNEYS

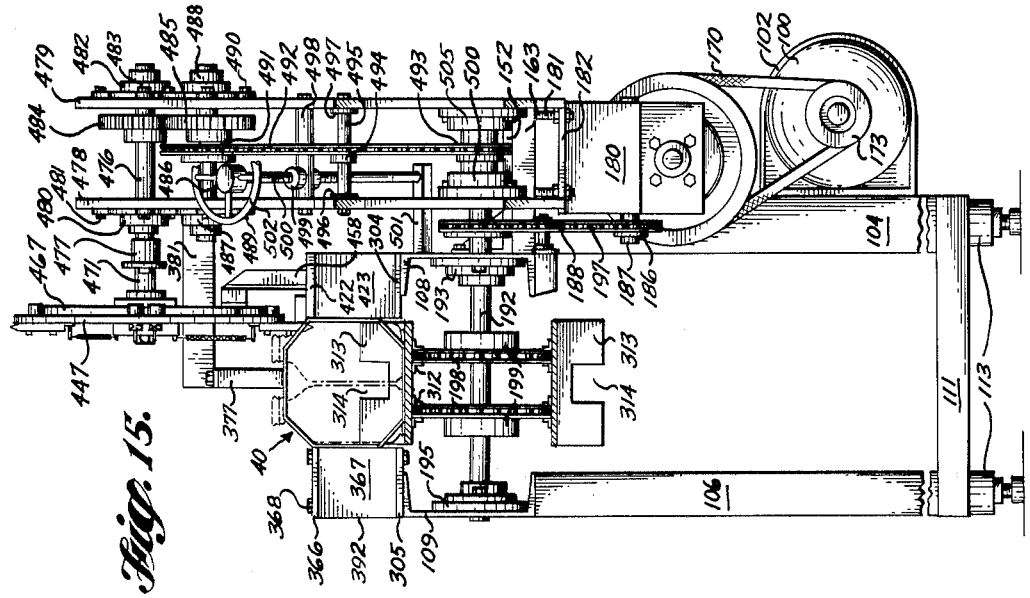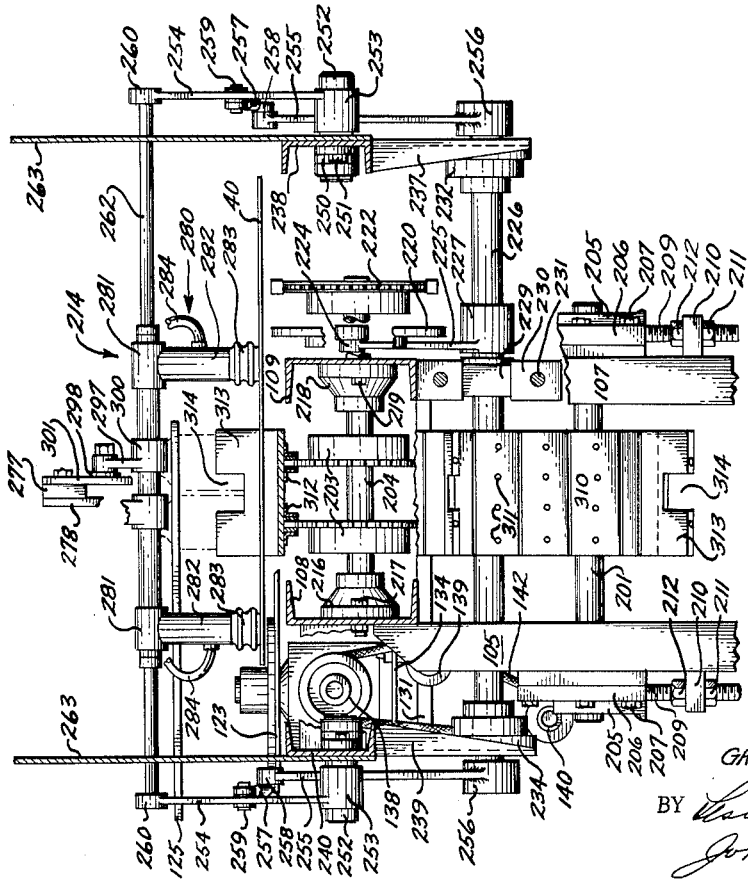

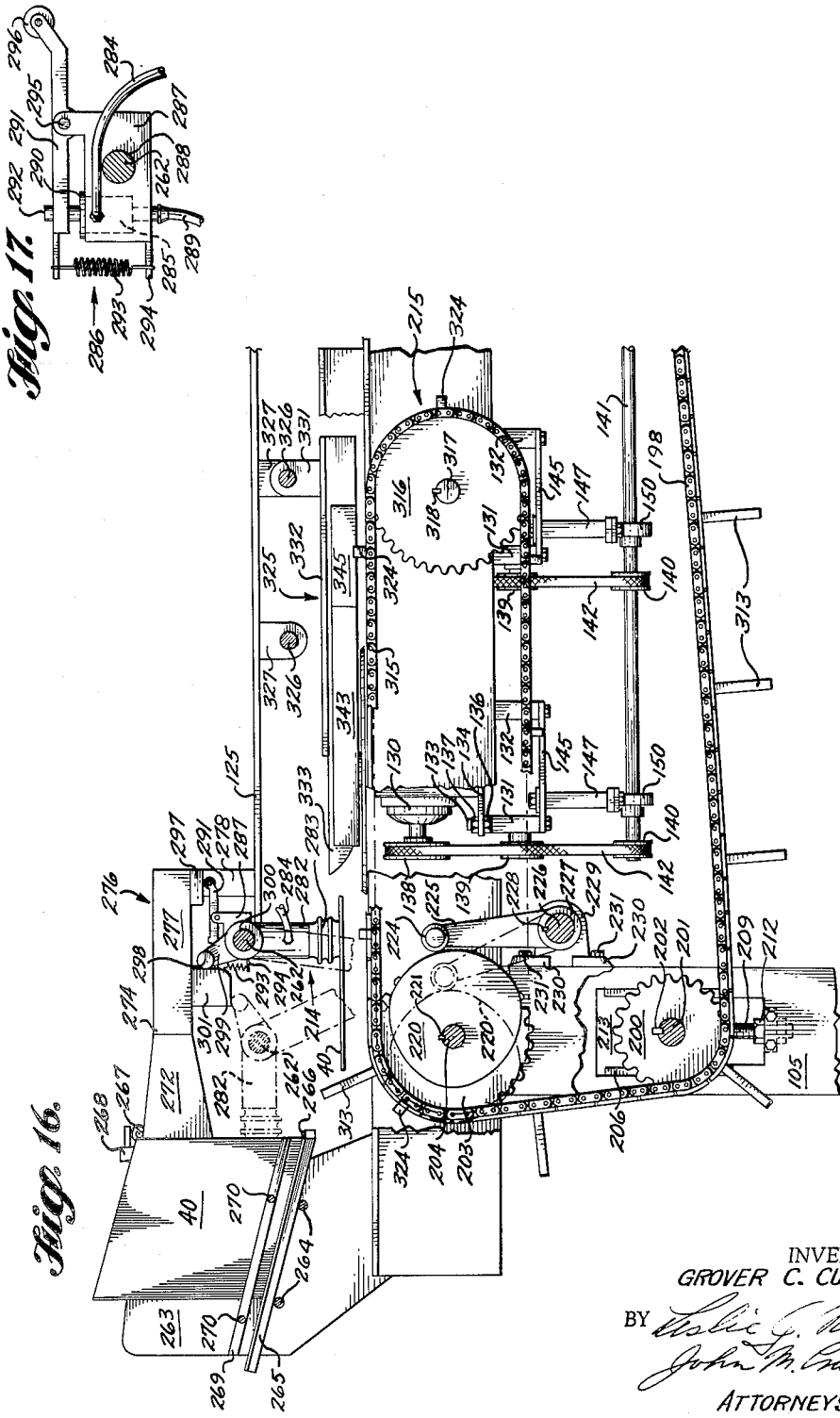

June 7, 1966
G. C. CURRIE, JR
3,254,470
MACHINE FOR PACKAGING ARTICLES
Filed Oct. 30, 1962
18 Sheets-Sheet 12
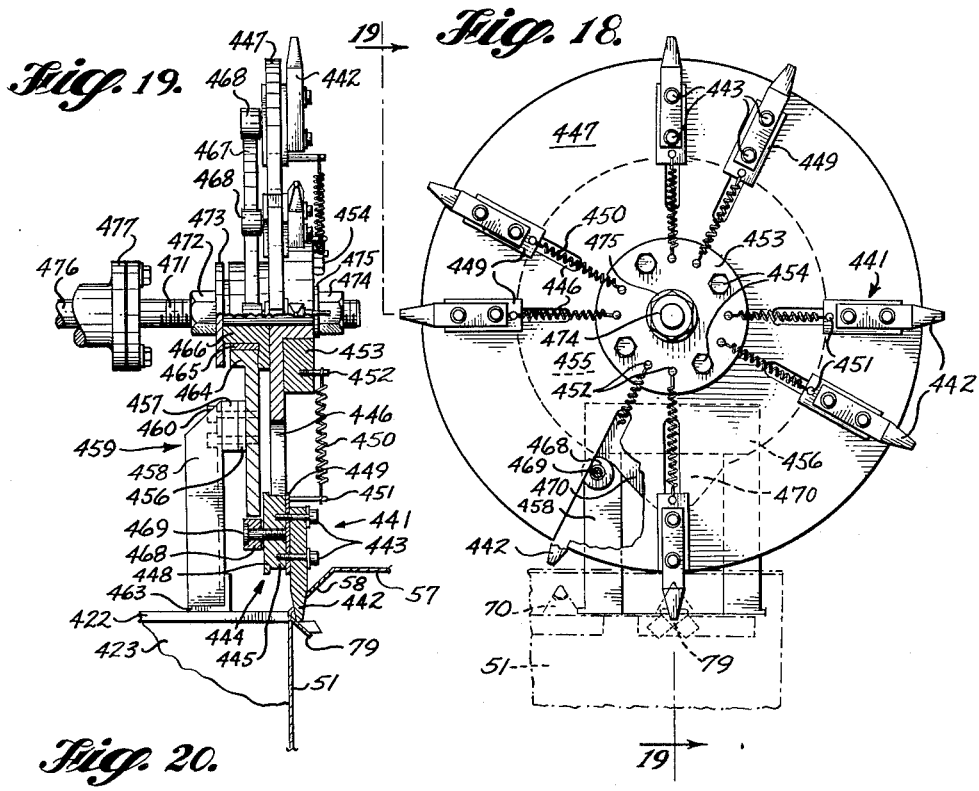
INVENTOR.
GROVER C. CURRIE, JR.
BY
ATTORNEYS

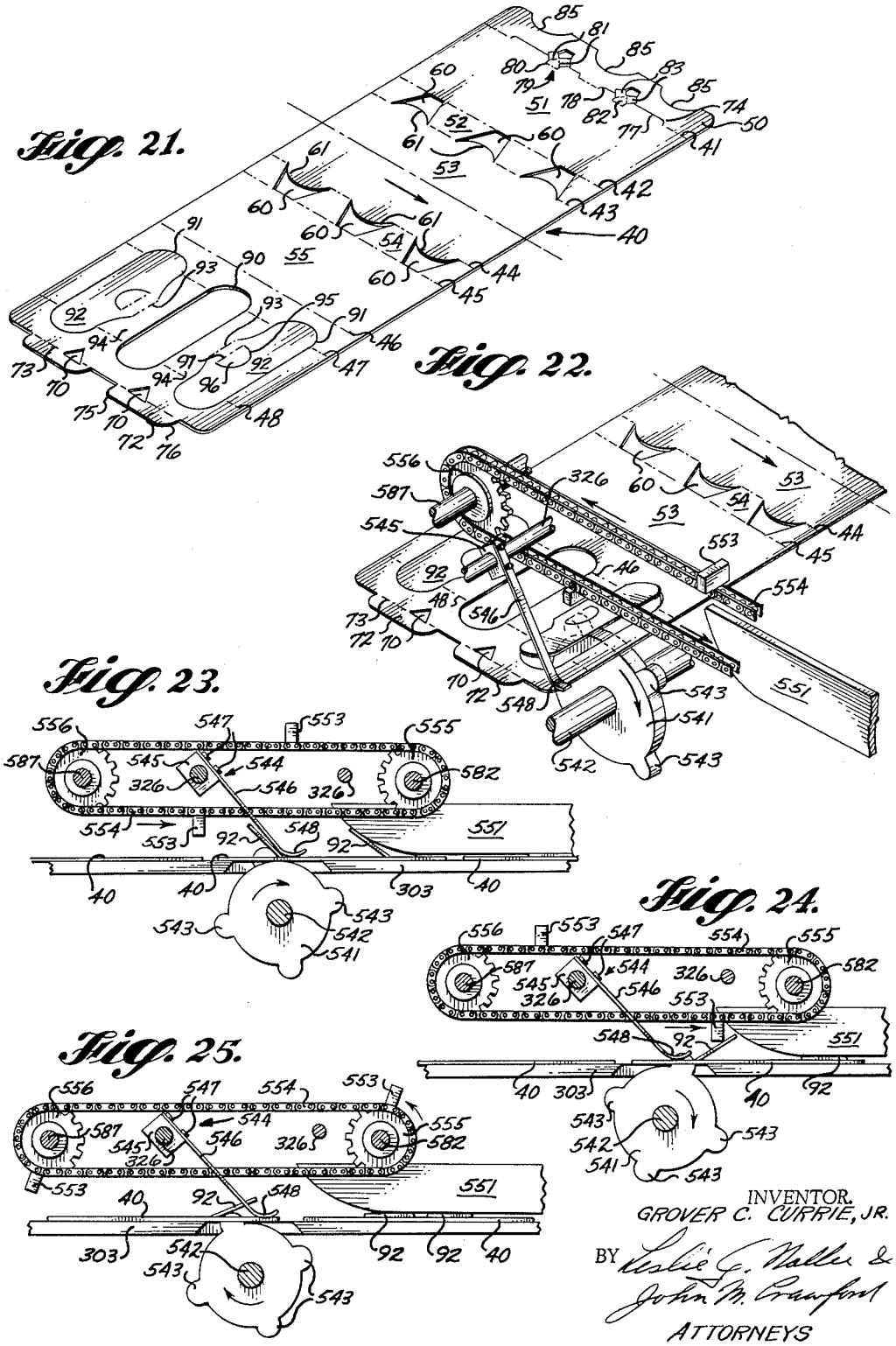

June 7, 1966  G. C. CURRIE, JR  3,254,470
MACHINE FOR PACKAGING ARTICLES
Filed Oct. 30, 1962  18 Sheets-Sheet 14
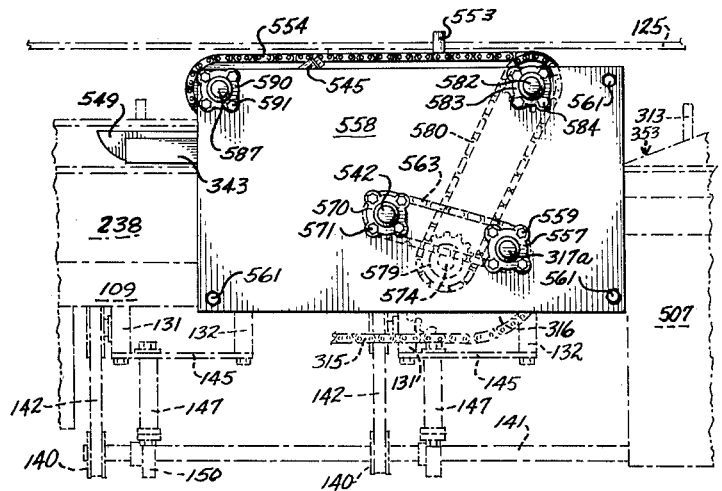
Fig. 26.
Fig. 28.
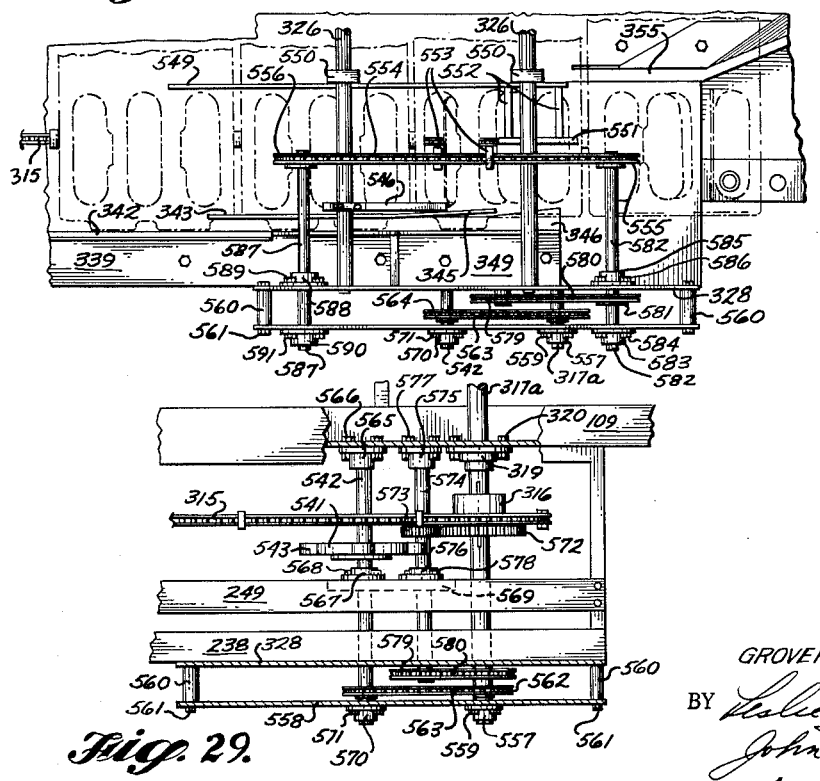
Fig. 29.
INVENTOR.
GROVER C. CURRIE, JR.
BY
ATTORNEYS June 7, 1966 G. C. CURRIE, JR 3,254,470
MACHINE FOR PACKAGING ARTICLES
Filed Oct. 30, 1962 18 Sheets-Sheet 15
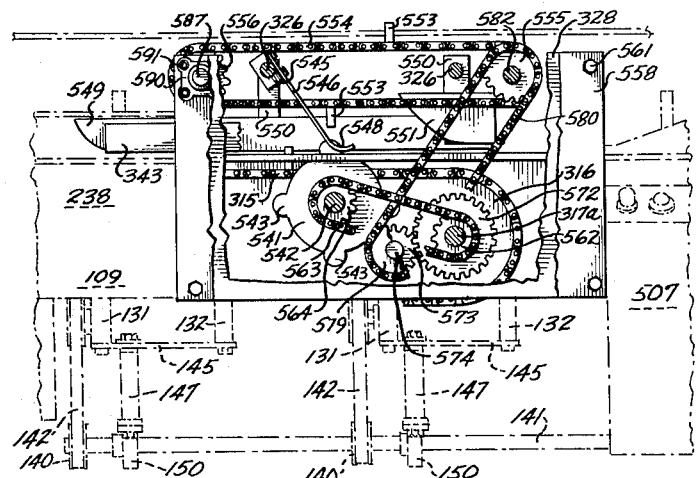
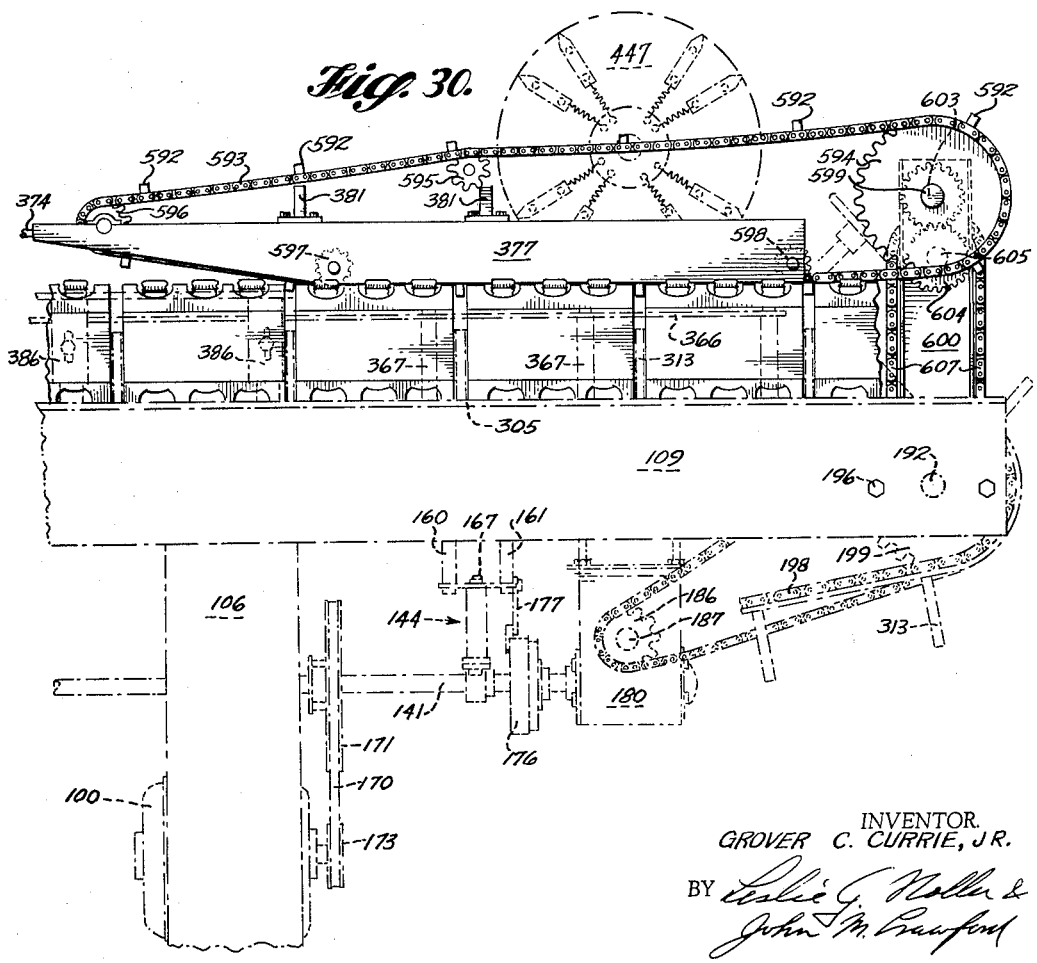
INVENTOR.
GROVER C. CURRIE, JR.
BY
ATTORNEYS June 7, 1966 G. C. CURRIE, JR 3,254,470
MACHINE FOR PACKAGING ARTICLES
Filed Oct. 30, 1962 18 Sheets-Sheet 16

INVENTOR.
GROVER C CURRIE, JR.
BY
ATTORNEYS

June 7, 1966 G. C. CURRIE, JR 3,254,470
MACHINE FOR PACKAGING ARTICLES
Filed Oct. 30, 1962 18 Sheets-Sheet 17

INVENTOR.
GROVER C. CURRIE, JR.
BY
ATTORNEYS

June 7, 1966  G. C. CURRIE, JR  3,254,470
MACHINE FOR PACKAGING ARTICLES
Filed Oct. 30, 1962  18 Sheets-Sheet 18
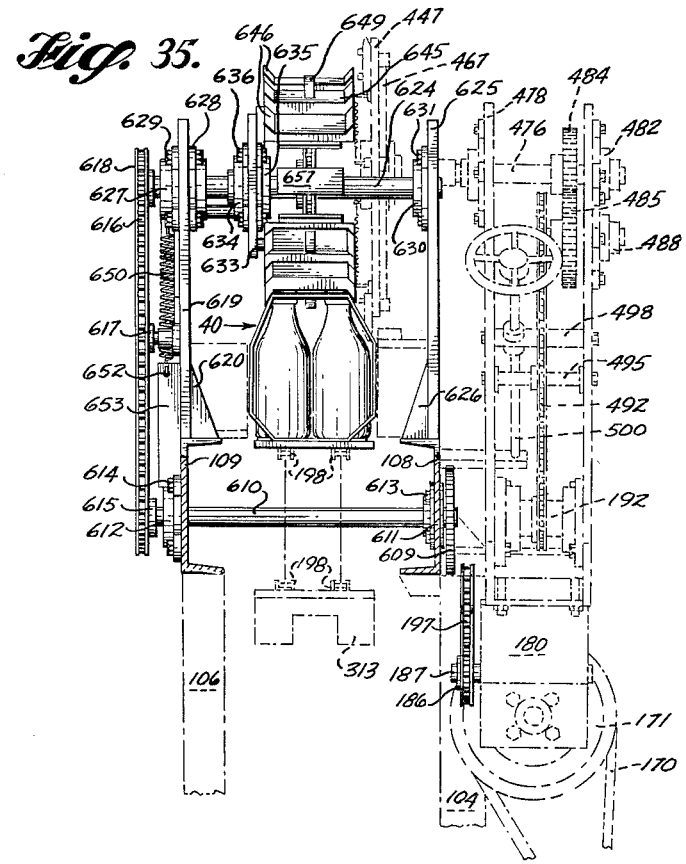
INVENTOR.
GROVER C. CURRIE, JR.
BY
ATTORNEYS

United States Patent Office 3,254,470
Patented June 7, 1966

3,254,470
MACHINE FOR PACKAGING ARTICLES
Grover C. Currie, Jr., Charlotte, N.C., assignor to Weyerhaeuser Company, Tacoma, Wash., a corporation of Washington
Filed Oct. 30, 1962, Ser. No. 234,155
20 Claims. (Cl. 53—48)

This invention relates to a process and apparatus for forming an article package, and specifically relates to a process and apparatus for forming an article package of the wrap-around type.

Apparatus for forming article packages should be integratable easily with a wide variety of packaging, processing, and conveying apparatus so that it may be installed in any plant without a relocation or change of the enlisting machinery. The packaging apparatus should be small and lightweight in order to reduce or eliminate modifications upon existing structures in which the machinery is to be housed. The machine should be simple in construction so that it may be adjusted and repaired easily, and should be easily modifiable so that it may be used with a variety of package styles.

It is an object of this invention to provide apparatus having one or more of the above features.

It is a further object of this invention to provide apparatus for forming a flat blank into a carton and another object to provide apparatus for placing articles upon a flat blank and wrapping said blank around said articles.

Still another object of this invention is the provision of a mechanism for the separation of adjoining portions of a blank. A still further object of this invention is the provision of a mechanism which will interlock the ends of a flat sheet.

Other objects of this invention are the provision of a process for the forming of a carton and the provision of a process for the formation of a package.

These and other objects will become readily apparent upon a reading of the following specification in conjunction with the attached drawings.

FIGURE 1 is an isometric view of a blank of a typical carton which may be processed by the present machine, and which may be formed into a package by a process described herein.

FIGURES 2–10 are isometric views of the carton and apparatus in various stages of formation, with portions cut away to show details of construction.

FIGURE 11 (A and B) is a side elevational view of the packaging apparatus with certain parts shown in skeletal outline to show details of constructions.

FIGURE 12 (A and B) is a top plan view of the packaging apparatus with portions cut away and certain parts shown in skeletal outline to show details of construction.

FIGURE 14 is a cross-sectional view of the feed mechanism taken along line 14—14 of FIGURE 11A.

FIGURE 15 is an end elevational view of the carton locking and outfeed section of the apparatus taken along line 15—15 of FIGURE 11B.

FIGURE 16 is a cross-sectional view of the feed mechanism and a portion of the carton forming apparatus taken along line 16—16 of FIGURE 12A with portions cut away to show details of the drive mechanism.

FIGURE 17 is a side elevational view of one form of valve used on the infeed vacuum system.

FIGURE 18 is a front elevational view of the locking mechanism, with portions cut away to show details of construction.

FIGURE 19 is a cross-sectional view of the locking mechanism taken along lines 19—19 of FIGURE 18.

FIGURE 20 is a wiring diagram of the apparatus.

FIGURE 21 is an isometric view of a blank of a modified form of carton having article separators. This carton may be processed by the present machine with a modification of the infeed section, and may be formed into a package by the process described herein.

FIGURE 22 is an isometric view of the modified carton and modified infeed section of the apparatus showing details of the carton formation.

FIGURES 23–25 are side elevational views of the modified carton and modified infeed section of the apparatus showing the carton in various stages of formation.

FIGURE 26 is a side elevational view of the modified infeed section of the apparatus.

FIGURE 27 is a side elevational view of the modified infeed section of the apparatus with portions cut away to show details of interior construction.

FIGURE 28 is a top plan view of the modified infeed section of the apparatus.

FIGURE 29 is a top plan view of the modified infeed section of the apparatus with portions cut away to show details of the drive mechanism.

FIGURE 30 is a side elevational view of an additional conveying apparatus in the carton forming and locking section of the apparatus.

FIGURE 35 is an end elevational view of the carton forming and locking section showing the modification of FIGURE 33.

Figure 9:
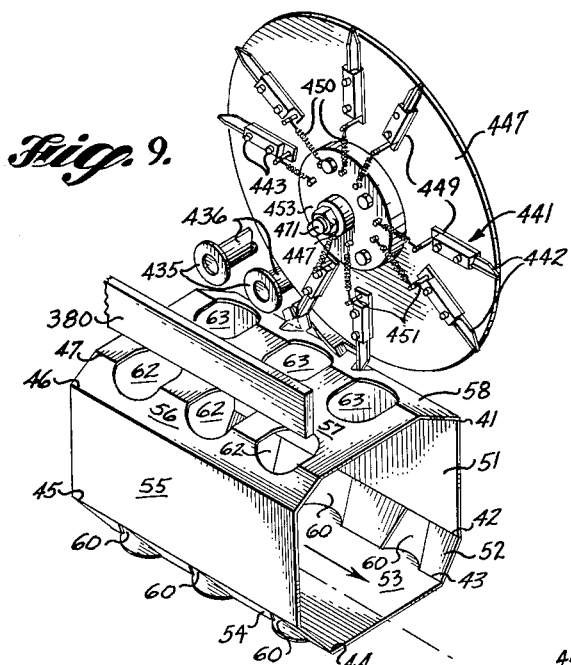
Figure 10:
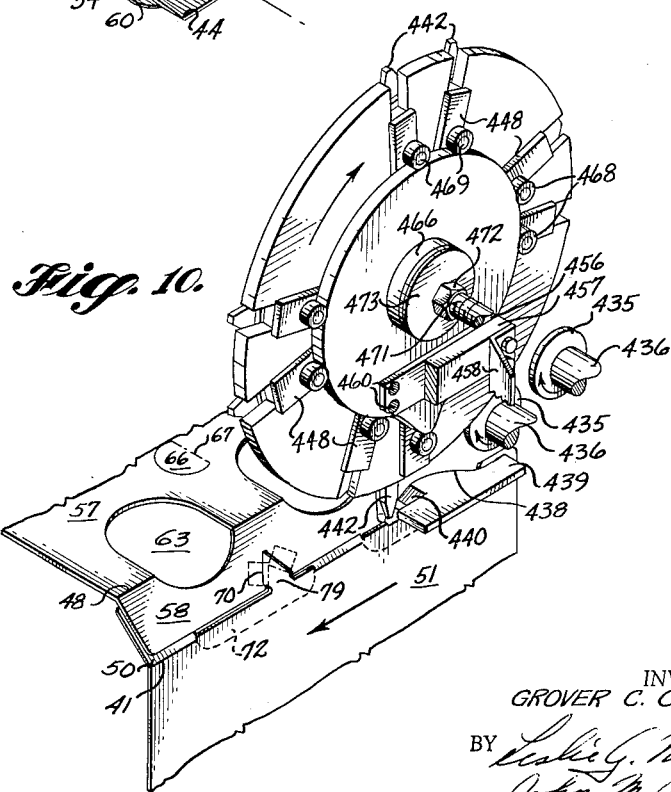

In the carton shown in FIGURES 1–10, the blank 40 is divided by a series of longitudinal score lines 41, 42, 43, 44, 45, 46, 47, and 48, which facilitate the bending and wrapping of the blank 40 around the articles to be contained therein. These score lines divide the carton into a first upper bevel panel 50, a side panel 51, a first lower bevel panel 52, a base panel 53, a second lower bevel panel 54, a side panel 55, a second upper bevel panel 56, a top panel 57, and a third upper bevel panel 58. These panels firmly hold the contained articles and prevent movement of these articles. The articles are also held by a number of apertures formed in several of the panels, protruding through the apertures and engaging certain of the aperture edges.

The apertures 60, formed in lower bevel panels 52 and 54, and extending the width of these panels have side and upper edges which engage the lower side of the contained articles. The shape of the articles will determine the shape of the aperture because the aperture edges must be shaped so they will engage the sides of the article. In the carton shown the apertures 60 are tapered toward score lines 42 and 45 so that they may engage the sides of a cylindrical article.

The protruding bases of the articles are protected by extensions 61 which extend from the base panel 53 into the apertures 60. These extensions conform to the shape of the article base and rest underneath the base.

The tops of the articles will also protrude from the carton through individual article apertures 62 and 63 in top panel 57 and upper bevel panels 56 and 58. The aperture 62, adjacent side panel 55, is longer than aperture 63 so that the outer edge 64 of aperture 62 will clear the top of the articles adjacent side wall 55 when the top and bevel panels 56, 57 and 58 are bent downwardly over the articles around score line 46. Carrying apertures 65 are also provided in top panel 57. These apertures are formed by bending tabs 66 inwardly around score lines 67 which hingedly connect the tabs 66 to upper panel 57.

Relief slits, in alignment with apertures 62, may be provided in score line 46 to allow a slight bending of side panel 55 during the forming of the carton and the interlocking of the ends of the carton in the package formation.

The locking is accomplished by the locking elements on upper bevel panels 50 and 58. Panel 58 has locking apertures 70 adjacent its outer edge. The number of apertures 70 will depend on the number and disposition of articles within the package, and the exact shape and location of the apertures 70 will depend on the design of the carton and its associated articles. The apertures 70 should be located so that the articles will not interfere with the locking operation, and will normally be aligned with the webs 71 between the adjacent article apertures 63. The apertures 70 may be tapered away from the outer edge of panel 58 and may be truncated to facilitate locking.

A reinforcing tab 72 is associated with each aperture 70. The tab 72 is hingedly connected to the outer edge of panel 58 by a score line 73, and is longer than its associated aperture 70 so it may have a positive interlock with the reinforcing aperture 74 formed in the other end of the carton. If the tab 72 is contiguous with the base of aperture 70, the additional length is also necessary for the attachment of tab 72 to panel 58. In the preferred form of tab 72 the rearward corner 75 will have a greater radius of curvature than the forward corner 76 to allow machine formation of the package. The direction of travel of the carton through the machine will determine the forward and rear corners of tab 72, and the width of tab 72 from its score line 73 to its outer edge will determine the actual radius of curvature of the corners. The greater radius of curvature of the rearward corner 75 will allow the tab 72 to be cammed forwardly into the reinforcing aperture 74.

The reinforcing aperture 74 is formed by a longitudinal slit 77 in panel 50. A pair of end extensions 78 connect the slit 77, parallel to and outwardly of score line 41, with score line 41, and allow the aperture 74 to be opened wider than the slit 77 alone permits. The larger opening allows the tab 72 to be inserted easily into aperture 74. The juncture of tab 72 with panel 58 is approximately equal to the length of aperture 74 at its juncture with score line 41, and the distance between tabs 72 along panel 58 is approximately equal to the distance between the apertures 74 along score line 41. This construction reduces sidewise movement of the tab 72 with respect to aperture 74 to a minimum and greatly reduces any movement between the adjoining sides of the carton.

A locking tab 79, hingedly connected to side panel 51 at 80 is aligned with each of the locking apertures 70, and is formed in or aligned with an aperture in the bevel panel 50. Each of the tabs 79 has a pair of angular score lines 81 which divide the tab 79 into a central portion 82 and outer portions 83. In the locking operation which will be described hereafter, the central portion 82 is forced through aperture 70, bending the outer portions 83 upwardly around the score line 81. After the outer portions 83 pass through apertures 70, pressure is removed from the central portion 82 allowing the outer portions 83 to return to their normal position and to lock behind bevel panel 58 as the entire tab 79 swings upwardly. The exact shape of locking tab 79 will depend on a number of carton design considerations.

The outer edge of panel 50 may be relieved at 85, coinciding with apertures 63, to allow the articles to protrude through the apertures 63.

The basic carton that has been described is formed into an article package by the process shown in FIGURES 2–10, and this process will be considered briefly in conjunction with these figures. The cartons are carried through the process on a main conveyor 122 that engages the base panel 53 of the blank 40 and carries the blank, and its associated articles, through the process at a speed that is timed to synchronize with the speed of the movable locking and forming elements of the machine performing the process. In addition to maintaining the blank 40 in synchronization with the movable locking and forming elements, it is also necessary to maintain the blank in proper orientation with respect to the stationary machine elements that form the blank 40 into the article package as the blank moves by these elements. This orientation is usually maintained by an auxiliary conveyor 215 that travels at the same lineal speed as the main conveyor 122 and engages the top panel 57 of the flat carton blank and maintains this panel in alignment with the base panel 53.

The auxiliary conveyor 215 carries the top panel 57 through the first forming operation of the process, shown in FIGURE 2. In this operation, the reinforcing tabs 72 are bent upwardly around score lines 73 by a stationary plow 346 that contacts the underface of the tab 72. The upper bevel panel 58 to which the tab 72 is attached is prevented from bending upwardly with the tab 72 by a hold-down shoe 343.

Simultaneously with, or immediately after, the above operation, the articles A are placed on the base panel 53 of the blank 40, and the blank is folded around the articles. As shown in FIGURE 3, a stationary plow 351 contacts the underface of side panel 55 and lifts it, and its associated lower level panel 54, upwardly around the score line 44 until the upper edges of the apertures 60, the score line 45, in the panel 54 contact the sides of the article. The side panel 55 continues to be bent upwardly around score line 45 by the stationary plow 351 until the side panel contacts the sides of the articles A.

During this operation the locking tabs 79 on the opposite side of the carton blank 40 are separated from their associated bevel panel 50 (FIGURE 4); and the side panel 51 and its associated bevel panel 52 are also formed around the articles A (FIGURE 5). The locking tabs 79 are separated from the panel 50 by a stationary plow 393 (FIGURE 4) that contacts the underface of the panel 50 and bends it upwardly around score line 41, and by an arm 394, pivoted at 410 and downwardly biased by a spring 412, that rides across the upper face of the panel 50 in line with the tabs 79 and forces the tabs 79 downwardly below the plane of the panel 50 and into the plane of the panel 51. The side panel 51, connected to the panel 50, is prevented from rotating upwardly with the panel 50 by a hold-down shoe (not shown). The stationary plow 393 is relieved beneath the arm 394 so that the tabs 79 may be forced into the plane of panel 51, and is undercut along its lower inner edge 416 so that the tabs 79 may slide below the stationary plow 393 after they have been separated from the panel 50.

Following this operation, the panels 50, 51, and 52 are formed around the articles A. The side panel 51 contacts a stationary plow 418 (FIGURE 5) which bends the side panel 51 and its associated bevel panel 52 upwardly around the score line 43 until the upper edges of the apertures 60, the score line 42, in the bevel panel 52 contact the sides of the articles A. The side panel 51 continues to be bent upwardly around the score line 42 by the stationary plow 418 until that panel contacts the sides of the articles A.

As the side panel 51 comes into contact with the articles A, the opposite side of the carton blank 40 continues to be wrapped around the articles A as illustrated in FIGURE 6. An overhead plow 370 bends the top panel 57 and its associated bevel panels 56 and 58 downwardly over the articles, first around score line 46 and then around score line 47. This action brings the interlocking elements 70 and 72 on one end of the carton blank into alignment with the interlocking elements 74 and 79 on the other end of the carton blank, and begins the interlocking process.

In the first part of the interlocking process, shown in FIGURES 7–8, the bevil panel 50 contacts a stationary plow 424 that bends the panel inwardly and downwardly around the score line 41 and bends locking tabs 79 outwardly around the score line 80, opening the reinforcing aperture 74; and the bevel panel 58 contacts a stationary plow 432 that bends the panel downwardly around the score line 48, and causes the reinforcing tabs 72, bent inwardly from the plane of the panel 58, to slide down the inner face of the stationary plow 424 and through the reinforcing apertures 74.

The outer face of the bevel panel 58 now contacts a pair of stationary rollers 435 (FIGURES 9–10) that bend the panel 58 downwardly around the score line 48 into contact with the bevel panel 50, bringing the reinforcing tabs 72 into full engagement with the reinforcing apertures 74 and aligning the locking tabs 79 with the locking apertures 70 for the second part of the interlocking process.

In this part of the process of the outer face of the locking tabs 79 contact a stationary plow 439 (FIGURE 10) that bends the locking tabs 79 inwardly and downwardly around the score line 80 until the tabs contact the outer face of the panel 58 and are over the locking aperture 70.

The outer face of the locking tab 79 is contacted by a reciprocating locking member 441 (FIGURES 9–10), which is timed to the lineal speed of the main conveyor 122 and the carton, and the tab is inserted through the locking apertures 70 by the locking member. This insertion causes the outer portions 83 of the locking tabs 79 to be bent upwardly around score lines 81 by the side edges of the apertures 70. When the outer portions 83 and the central portion 82 are completely within the carton, the outer portions 83 spring back into the plane of the central portion 82. Upon removal of the downward pressure of the locking member 441 on the tab 79 by the upward movement of the locking member, the tab 79 rotates upwardly around the score line 80 until the outer portions 83 contact the inner face of the bevel panel 58. This action locks the ends of the carton blank together and forms the article package.

The apparatus for performing this process is shown in FIGURES 11–20. It is necessary to synchronize the transferring, conveying, and movable locking elements of the apparatus in order to interlock the ends of the carton properly, and this synchronization is accomplished by driving the transferring, conveying, and movable locking elements of the apparatus with a single motor 100. The motor 100 is attached to a mounting plate 101 in any suitable manner. The attachment may be by means of straps, such as the straps 102 shown, which are bolted by bolts 103 to the mounting plate 101. If desired, the bolt holes in the mounting plate 101 may be elongate, allowing an adjustable placement of the motor 100 on the mounting plate 101.

The mounting plate 101 is fixedly mounted in some manner to the upright 104. This upright is one of the four uprights—104, 105, 106, and 107—that support the horizontal frame members of apparatus, the uprights 104 and 105 supporting the horizontal frame member 108 on the drive side of the apparatus and the uprights 106 and 107 supporting the horizontal frame member 109 on the operator's side of the apparatus. The uprights 104, 105, 106, and 107 and the horizontal frame members 108 and 109 are formed preferably from channel iron, although other shapes having the necessary strength and rigidity may be used.

The uprights 104, 105, 106, and 107 may be attached to the horizontal frame members 108 and 109 in any manner. For example, the uprights may be welded to a leg of the frame channel as shown in the drawings by the uprights 106 and 107 which are welded to the lower leg of the horizontal frame member 109, or the webs of the uprights may be bolted to the webs of the horizontal frame members as is shown by the uprights 104 and 105 which are fastened to the web of the frame member 108 by bolts 110. Either method provides a rigid construction.

Additional rigidity and bracing is provided by the transverse horizontal frame member 111 that supports and is attached to the uprights 104 and 106, and the transverse horizontal frame member 112 that supports and is attached to the uprights 105 and 107. Each of the members 111 and 112 has a leg 113 at each end which may be adjusted in height, leveling the apparatus so that the articles A will remain in upright position during the packaging process.

The legs 113 may also raise or lower the apparatus to the height of any existing equipment being used with the apparatus. This equipment usually carries the articles from the filling and capping station to the packaging station. For example, an existing conveyor, such as conveyor 114, may transport the articles A from the filling and capping station to the packaging station. The conveyor 114 is usually driven by an existing power source and is not connected to the motor 100. The existing power source (not shown), or the existing motor (not shown), drives a chain 115 through a conventional drive shaft and sprocket arrangement (not shown). The chain 115, trained around the sprocket 116 on the drive shaft 117 of the conveyor 114, turns the shaft 117, rotatably journalled in bearing 118. The conveyor drive sprockets also mounted on the shaft 117 engage the conveyor chains of the conveyor 114 and move them forwardly, driving the conveyor 114. The conveyor chains mount a number of plates 119 which support the articles A and carry them from the filling and capping station to the packaging station.

The articles A may be transferred from the existing conveyor 114 to the packaging apparatus in any convenient manner. For example, the articles may be discharged from the end of the conveyor 114 or be guided from the side of the conveyor 114, onto a revolving accumulator turntable (not shown) which would provide an article reservoir and would smooth the flow fluctuations between the filling and capping station and the packaging station. The articles A may also be guided directly from the conveyor 114 to the packaging apparatus as shown. In either system, one or more guide rail pairs 120 may be provided to guide the articles to the packaging apparatus. Each of the pairs 120 guides a row of articles A from the existing conveyor 114 to a turntable mechanism 121 on the packaging apparatus.

Because each of the turntable mechanisms 121 carries a row of articles from the conveyor 114, or the accumulator turntable, to the base panel 53 of the carton blank 40 which is supported on and carried by the main conveyor 122 of the packaging apparatus, the number of such turntable mechanisms 121 will depend upon the number of rows of articles in the package. Two such mechanisms are illustrated. They are identical in construction, and like reference numerals will therefore be used for the identical elements in each.

Each of the turntable mechanisms 121 has a continuously revolving steel turntable 123 which carries the articles through a guide track 124 formed in the article infeed guide assembly 125, mounted above the turntable mechanisms 121. The guide assembly 125 is fastened by bolts 126 to the frame members which are supported by the central shaft 127 of the turntable 123 and which hold the assembly above the turntable mechanisms 121, the conveyor 122, and the carton blank 40. The guide assembly also accumulates the articles A in each guide track 124 during periods in which the packaging apparatus and the main conveyor are stopped, assuring a ready supply of articles for immediate transfer to the blank 40 when the packaging apparatus is started. This accumulation is created by the continuously revolving turntable 123 which carries articles into the track 124 until the track is filled, and then slides beneath the articles in the filled track as it continues to revolve.

A member 128, which is fastened to the turntable 123 by bolts or rivets 129, fixedly mounts the turntable 123 to the vertical shaft 127 that extends upwardly from and is driven by a speed reducer 130.

The speed reducer 130 is supported by transverse bars 131 and 132 that are welded, bolted, or otherwise fixedly mounted to the underside of the frame members 108 and 109, and that extend outwardly of the member 108 on the drive side of the apparatus. These outward extensions of the transverse bars 131 and 132 have a number of stud bolts 133 that extend upwardly from the bar through apertures in a mounting plate 134 on which the speed reducer 130 is mounted by bolts 135. The plate 134 is supported by nuts 136 which are threadably mounted on the rods 133 below the plate, and are held on the nuts 136 by the nuts 137 that are threadably mounted on the stud bolts 133 above the plate. The nuts 136 and 137 allow the mounting plate 134 to be raised or lowered and to be locked in place on the stud bolts 133, aligning the turntable 123 with the conveyors 114 and 122 and allowing the articles to be transferred smoothly from the existing conveyor 114 to the main conveyor 122 by the turntable 123.

The speed reducer 130 which drives the turntable 123 has a sheave 138 that is aligned with an idler sheave 139, slidably mounted on the transverse bar 131, and with a drive sheave 140, fixedly mounted on a drive shaft 141. A drive belt 142 is trained around the sheaves 138, 139, and 140, and its pressure on the sheaves is adjusted by the sideways sliding of the idler sheave 139 on the transverse bar 131. The drive belt 142 is driven continuously by the drive shaft 141, causing the turntables 123 to revolve continuously.

The drive shaft 141 extends longitudinally of the packaging apparatus and is mounted to the frame of the apparatus in any suitable manner. As illustrated, the drive shaft may be supported below the drive side of the apparatus by a hanger assembly 143 below each of the turntable mechanisms 121 and by a hanger assembly 144 (FIGURE 11B) at the opposite end of the drive shaft.

The hanger assembly 143 is fastened to a plate 145 that is held onto the lower side of the transverse bars 131 and 132 by machine screws 146, and has a downwardly extending yoke 147 which is attached to the plate 145 by a machine screw 148 and to which a hanger 149 is attached by bolts 150.

The hanger assembly 144 depends from an outer frame assembly 151. This frame assembly has a plate 152 which is fastened to the horizontal frame member 108 by a pair of upper brackets 153 and 154. Each of these brackets extends across the upper face of the plate 152 and is fastened to the plate by machine screws 155. Each of the brackets has an upwardly extending leg which is bolted to the outer web of frame member 108, the bracket 153 having an upwardly extending leg 156 which is bolted to frame member 108 by bolts 157 and the bracket 154 having an upwardly extending leg 158 which is bolted to frame member 108 by bolts 159.

The plate 152 is also fastened to and supported by transverse bars 160, 161, 162, and 163. The inner end of each of these bars is contiguous with the web of frame member 108, and fastened to the web by machine screws extending through and outwardly of the web.

Two of the transverse bars, transverse bars 160 and 161, extend below the lower edge of the frame member 108 and have a supporting plate 164 fastened to their lower edges by machine screws 165. The yoke 166 of the hanger assembly 144 is adjustably fastened to the plate 164 by a machine screw 167, and has the hanger 168 of the assembly 144 fastened to its lower end by bolts 169.

The hangers 168 and 149 have apertures through which the drive shaft 141 extends and in which the shaft is rotatably mounted. The drive shaft 141 is rotated continuously by a drive belt 170 (FIGURE 11B) that is trained around a sheave 171, fixedly mounted on the drive shaft 141 by the key and keyways 172, and a sheave 173, fixedly mounted on the drive shaft 174 of the motor 100 by the key and keyway 175. The tension on the drive belt 170 may be adjusted by moving the motor 100 on its mounting plate 101.

The outfeed end of the drive shaft 141 is connected to an electric clutch 176 that connects and disconnects the drive shaft 141 and the motor 100 from the moving parts of the apparatus other than the turntables 123. This allows the moving parts of the apparatus to be started and stopped quickly without stopping the motor 100.

Figure 13B:
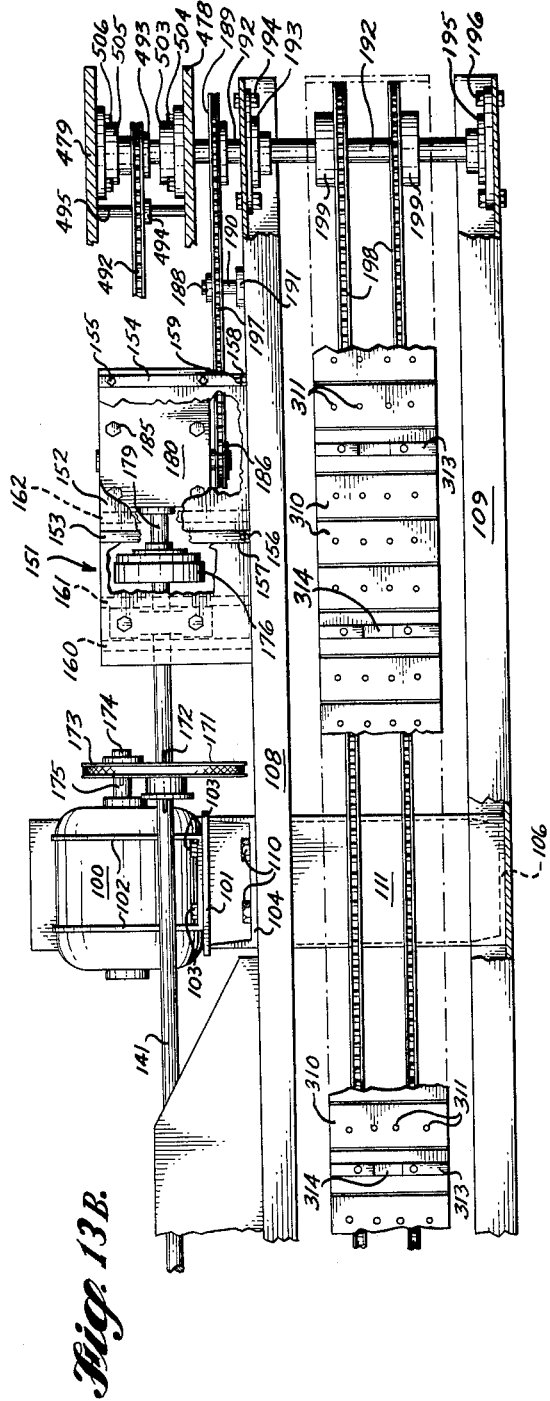
FIGURE 13 (A and B) is a top plan view of the packaging apparatus, with portions cut away to show details of the drive mechanism.

The electric clutch 176 is mounted below the outer frame assembly 151 by a bracket 177 which is fastened to the transverse bar 161 by a machine screw 178. The electric clutch 176 is connected to the drive shaft 179 of a speed reducer 180. The drive shaft 179 is aligned with the clutch 176 and the main drive shaft 141, requiring the speed reducer 180 to be mounted adjustably on the outer frame 151 of the machine. As is best shown in FIGURES 11B, 13B, and 15, the transverse bars 162 and 163 of the frame assembly 151 have downwardly extending stud bolts 181 which extend through apertures in a mounting plate 182. The mounting plate 182 is supported on the stud bolts 181 by lower nuts 183, threadably mounted on the stud bolts 181 below the mounting plate 182, and is held in place on the stud bolts by upper nuts 184, threadably mounted on the bolts 181 above the mounting plate 182. The speed reducer 180 is fastened to the mounting plate 182 by bolts 185 which extend through transverse elongate apertures in the mounting plate 182, allowing transverse adjustment of the speed reducer. The speed reducer 180 may also be adjusted vertically with respect to the frame of the machine by raising or lowering the mounting plate 182 on the stud bolts 181 by the clockwise or counterclockwise movement of the upper and lower nuts 183 and 184.

The speed reducer 180 has an output drive sprocket 186 which is fixedly mounted on an output drive shaft 187. The sprocket 186 is aligned with an idler sprocket 188 and a main conveyor drive sprocket 189. The idler sprocket 188 is fixedly mounted on a shaft 190 which is rotatably journalled in a bearing assembly 191, mounted on the outer web of frame member 108; and the drive sprocket 189 is fixedly mounted on the main conveyor drive shaft 192 which extends through an aperture in the web of frame member 108 and is rotatably journalled in a bearing assembly 193, fastened to the horizontal frame member 108 by a pair of bolts 194, and a bearing assembly 195, fastened to the horizontal frame member 109 by a pair of bolts 196.

The drive shaft 192 is driven by a drive chain 197 which is trained around the sprockets 186, 188, and 189. The shaft 192 drives all of the moving elements of the machine other than the turntables 123 through a number of sprocket and drive chain assemblies. One such assembly is the main conveyor which has two chains 198 that drive a number of the moving elements of the machine. The chains 198 are between the horizontal frame members 108 and 109, and extend longitudinally of the machine from the infeed end to the outfeed end. On the outfeed end of the machine the chains 198 train around two sprockets 199 fixedly mounted on the drive shaft 192, and on the infeed end of the machine the chains 198 train around two lower idler sprockets 200, fixedly mounted on a shaft 201 by key and keyway assemblies 202, and two upper sprockets 203, fixedly mounted on a shaft 204 by key and keyway assemblies (not shown).

The tension on the conveyor chains 198 may be varied by raising or lowering the height of the lower idler sprockets 200 and the lower sprocket shaft 201. These elements are raised or lowered by raising or lowering the journal blocks 205 in which the lower sprocket shaft 201 is journalled.

Each of the journal blocks 205 is slidably mounted in a pair of guide members 206 that are fastened to the uprights 105 and 107 by the bolts 207, and is raised and lowered in the guide members 206 by jackscrew assemblies 208. The screws 209 of each of the jackscrew assemblies 208 is rotatably mounted in the lower edge of the journal block 205, and extends through an aperture in the post 210 mounted on each of the uprights 105 and 107 below the journal block 205. A nut 211, threadably mounted on the screw 209 below the post 210, and a nut 212, threadably mounted in the screw 209 above the post 210, raise and lower the screw 209 and its attached journal block 205 and lock the screw 209 and the journal block 205 in position. If, as shown, the journal blocks 205 are mounted on the outer faces of the uprights 105 and 107 then the webs of the uprights 105 and 107 will have suitable apertures 213 through which the shaft 201, journalled in the journal blocks 205, extends and in which the shaft 201 is raised and lowered.

This adjustment of the lower sprocket 200 allows the chains 198 to mesh properly with the upper sprockets 203. This is necessary because the upper sprocket shaft 204 acts as a drive shaft for all the movable elements on the infeed end of the machine, driving both the carton blank transfer assembly 214 and the auxiliary conveyor 215. The shaft 204 is rotatably journalled in a bearing assembly 216, fastened to the horizontal frame member 108 by a pair of bolts 217, and a bearing assembly 218, fastened to the horizontal frame member 109 by a pair of bolts 219, and extends outwardly of the frame member 109 through an aperture in the frame member. This outwardly extending section of the upper sprocket shaft 204 carries both a cam 220, fixedly mounted on the shaft by a key and keyway assembly 221, and a sprocket 222, fixedly mounted on the shaft by a key and keyway assembly (not shown).

The cam operates the carton blank transfer assembly 214 which transfers the carton blanks from the carton blank magazine 223 to the main conveyor 122 and auxiliary conveyor 215. The cam 220 moves a cam follower 224 mounted on a rocker arm 225 forwardly and backwardly, pivoting a lower pivot shaft 226, to which the sleeve 227 of the rocker arm 225 is fixedly mounted by a key and keyway assembly 228, forwardly and backwardly. As best shown in FIGURES 14 and 16, the pivot shaft 226 is pivotally mounted in bearing assemblies 229 having base members 230 that are fastened to the inner legs of each of the uprights 105 and 107 by bolts 231, a bearing assembly 232 depending from the operating side infeed outer frame assembly 233, and a bearing assembly 234 depending from the drive side infeed outer frame assembly 235.

The bearing assembly 232 is fastened by bolts 236 to the inner web of a downwardly extending and tapered channel member 237 that is welded or otherwise fastened to the lower edge of the outer longitudinal frame member 238 of the frame assembly 233; and the bearing assembly 234 is similarly attached to the web of a downwardly extending and tapered channel member 239 that is attached to the lower edge of the outer longitudinal frame member 240 of the frame assembly 235.

The longitudinal frame members 238 and 240 are preferably of channel iron, and are fastened to the longitudinal frame members 109 and 108 by transverse bars which extend between the webs of the outer frame members 238 and 240 and the inner longitudinal frame members 109 and 108. The ends of the transverse bars are fastened to the webs of the frame members by machine screws 241—the transverse bars 242 and 243 being fastened to the webs of frame members 108 and 240, and the transverse bars 244, 245, and 246 being fastened to the longitudinal frame members 109 and 238. Additional bars may be provided. Additional rigidity is provided by the longitudinal stiffening member—the longitudinal stiffening member 247 on the drive side adjacent the frame member 108 and the longitudinal stiffening members 248 and 249 on the operating side—which extend between and are fastened to the transverse bars.

As shown in FIGURE 14, each of the frame members 238 and 240 has a bearing assembly 250 mounted on its inner face by bolts 251. Each of the bearing assemblies 250 is aligned with an aperture in one of the frame members 238 and 240, and has a pivot shaft 252 pivotally mounted within it. Each of the pivot shafts 252 extends through the aperture outwardly of the outer frame member and fixedly mounts the sleeve 253 of an upper rocker arm 254.

The upper rocker arm 254 is pivoted backwardly and forwardly by a lower rocker arm 255 which is mounted on the lower pivot shaft 226. The pivot shaft 226 extends outwardly of the channel members 237 and 239 through apertures in the webs of the channel members. Each of the outwardly extending sections of the pivot shaft 226 fixedly mounts a sleeve 256 of a rocker arm 255, causing the arm 255 to move forwardly and backwardly with the shaft. The motion of the lower rocker arm 255 is transmitted to the upper rocker arm 254 by a turnbuckle 257 that is pivotally mounted to a post 258 on the outer end of rocker arm 255 and a post 259 at the center of the rocker arm 254. The turnbuckle 257 is adjustable, allowing the length of the arc through which the outer end 260 of the rocker arm 254 will travel to be adjusted.

Each of the rocker arms 254 has an aperture 261 in its outer end 260. A shaft 262, which is pivotally mounted in the aperture 261, extends between the rocker arms 254 and supports the vacuum transfer apparatus which carries the blanks 40 from the carton blank magazine 223 to the conveyors 122 and 215.

The carton blank magazine 223, which stores the blanks 40 prior to their travel through the machine, is connected to the outer longitudinal frame members 238 and 240 by side walls 263. A pair of transverse bars 264 (FIGURE 16) extends between the side walls 263 and supports a number of forwardly tilted longitudinal bars 265 which support the flat blanks 40 in the magazine. Each of the bars 265 has an upwardly extending detent 266 on its forward end which engages the lower front face of the front blank 40 and holds the stack of blanks within the magazine 223. The blanks 40 may be held against the detent 266 by a forwardly moving weight or by any other suitable means.

The upper front face of the front blank 40 is held within the magazine 223 by a transverse bar 267 that extends between the side walls 263 and is supported at each end by a member 268 that is adjustably mounted on the side wall 263. This adjustability allows the bar 267 to be raised or lowered to accommodate various sized carton blanks.

The stack of blanks in the magazine 223 is aligned with the conveying and forming elements of the machine by side alignment plates 269. Each of the alignment plates 269 is adjustably mounted on a side wall 263 by a pair of stud bolts 270 which extends through apertures in the side wall 263 and which are fastened to the side wall 263 by a pair of nuts 271, one on each side of the side wall 263, which allows the stud bolts 270, and the attached side alignment plate 269, to be adjusted horizontally with respect to the side wall 263.

Each of the side walls 263 has an upper extension 272 which allows the side wall 263 to be held rigidly on the machine. The upper extensions 272 are tied together at their outer ends 273 by a transverse bar 274 that is bolted, as by bolts 275, or otherwise fixed to the ends 273, and are fastened to the machine by a longitudinal L-shaped supporting member 276 having a horizontal leg 277 that is fastened to the central portion of the transverse bar 274 and a vertical leg 278 that is fastened to the upper face of the guide assembly 125. Additional rigidity may be imparted to the infeed section of the apparatus and to the magazine 223 by a transverse bar 279 (FIGURE 13A) which extends between the longitudinal frame members 108 and 109 and is fastened to the frame members. This rigidity insures that the carton blanks 40 will be in proper alignment with the packaging apparatus when they are taken from the magazine 223 and deposited on the conveyors 122 and 215.

The carton blanks 40 in the magazine 223 are removed individually from the magazine and carried upwardly and outwardly by the vacuum units 280 which are rigidly mounted to the shaft 262. Each of the vacuum units 280 has a sleeve 281 which fastens the unit to the shaft 262, a rigid housing 282 attached to the sleeve 281 and a resilient head 283 mounted on the outer end of the housing 282, and is connected to a source of vacuum by a flexible hose 284 which extends between and is connected to the rigid housing 282 and to the valve chamber 285 of a valve unit 286, shown in FIGURE 17.

The body 287 of the valve unit 286 is rigidly mounted at 288 to the shaft 262, and is connected to a vacuum source (not shown) by a flexible hose 289 which extends between and is connected to the valve chamber 285 and the vacuum source. The valve units 286 are located between the vacuum unit 280 and the vacuum source, and disconnect the vacuum units 280 from the vacuum source by opening the valve chamber 285 to the outside atmosphere, drawing air into the vacuum source through the chamber 285 instead of the units 280; and connect the vacuum units 280 to the vacuum source by closing the valve chamber 285 to the outside atmosphere, drawing air into the vacuum source through the vacuum units 280. The opening and closing of the vacuum chamber 285 to the outside atmosphere is done by a cap 290 which closes the open top of the chamber and which may be raised, opening the chamber to the outside atmosphere.

The cap 290 is moved between the open and closed positions by a pivoted arm 291, connected to the cap 290 by a shaft 292 that extends upwardly from the cap and is fixed to the arm 291. The arm 291 and the attached cap 290 are biased into the closed position against the open top of the valve chamber by a tension spring 293, extending between the arm 291 and an extension 294 on the valve body 287. It is also possible to use a compression spring between the arm 291 and the valve body 287 on the opposite side of the pivot 295 of the arm 291.

The cap 290 is moved upwardly out of contact with the chamber 285 by pivoting the arm upwardly. The arm is pivoted by a rotatable cam follower 296, mounted on the end of the arm 291 that is opposite the cap 290, which contacts an abutment 297 (FIGURE 16), depending from the horizontal leg 277 of the support member 276, during the portion of the travel of the transfer assembly 214 in which the blanks 40 are held in position over the conveyors 122 and 215. The contact between the cam follower 296 and the abutment 297 depresses the cam follower 296 and pivots the arm 291 and cap 290 out of contact with the open end of the valve chamber 285. Air is drawn in through the chamber 285 instead of through the vacuum units 280, releasing the blank 40 from the vacuum units and causing it to drop onto the conveyors 122 and 215. The cam follower 296 moves out of contact with the abutment 297 as the transfer assembly 214 moves toward the magazine 223, allowing the tension spring 293 to pivot the arm 291 and the cap 290 into contact with the upper end of the valve chamber 285. Air is drawn in through the vacuum units 280, allowing the vacuum units to withdraw another blank 40 from the magazine 223.

The vacuum units 280 must be in a horizontal position during the pick-up and removal of the blanks 40 from the magazine 223, and must be in a vertical position during the deposition of the blanks 40 onto the conveyors 122 and 215. The vacuum units 280, and the shaft 262 to which they are attached, are pivoted between these positions by a cam follower 298 that is fixedly mounted to the shaft 262 by an arm 299 and a sleeve 300. The cam follower 298 is biased into contact with an abutment 301 depending from the horizontal leg 277 of the supporting member 276, and is positioned during the transfer cycle by the abutment 301.

The cam follower 298 is in contact with the lower edge of the abutment 301 during the portion of the cycle in which the transfer assembly 214 approaches and withdraws from the magazine 223, and maintains the vacuum units 280 in a horizontal position during this approach and withdrawal. This positioning causes the heads 283 of the vacuum units 280 to traverse an arc, allowing the heads 283 to carry the blanks 40 upwardly over the detents 266 of the magazine 223 during the withdrawal of the blank from the magazine.

The further travel of the transfer assembly 214 causes the cam follower 298 to contact the rear vertical edge of the abutment 301, pivoting the shaft 262 and the vacuum units 280 into the vertical position. This action positions the blank 40 horizontally (FIGURES 14 and 16) over the conveyors 122 and 215, and the bed of the machine.

The machine bed is formed by the supporting plates 302 and 303 (FIGURE 12A) which are fastened to the frame members of the machine by the longitudinal fastening plates 304 and 305. The longitudinal fastening plate 304 fastens the supporting plate 302 to the longitudinal frame 108, and the longitudinal fastening plates 305 fastens the supporting plate 303 to the longitudinal frame member 109. The fastening members are held to the frame members by bolts 307.

As the transfer assembly 214 moves the blank 40 into position over the conveyors 122 and 215, the valve unit cam follower 296 contacts the abutment 297, disconnecting the vacuum unit 280 from the vacuum source and dropping the blank 40 onto the conveyors. The transfer assembly 214 is then pulled toward the magazine 223 by tension springs 308 extending between the upper rocker arm 254 and a post 309 on the outer side wall 263 of the magazine 223, beginning another transfer cycle.

The base panel 53 of the blank 40 drops onto the supporting plates 310 on the main conveyor 122. These plates are wider than the base panel 53 and support both the base panel and the articles A during their travel through the machine, and are attached to the chains 198 of the conveyor 122 by screws 311 which engage threaded apertures in the angle brackets 312 (FIGURES 14 and 15) on the links of the chains 198. The plates 310 are short, there being four plates for each row of three articles preferably, so that the plates may be carried around the sprockets 199, 200, and 203 by the chains 198.

Every fourth supporting plate 310 has an upwardly extending abutment 313 that contacts the rear edge of the base panel 53, and carries the panel 53 and its associated articles A forwardly through the machine. Longer cartons will require a different placement of the abutments 313 on the supporting plates 310. In any arrangement, however, the abutments 313 will be placed equidistantly around the conveyor 198. The illustrated abutment members 313 have central notches 314 on their outer edges. These notches allow the abutments 313 to clear the outfeed conveyor (not shown) of the machine.

The abutments 313 must carry the blanks 40 through the machine with the blanks normal to the path of travel of the conveyor 122 if the blanks are to be folded and locked properly. The panels 55–58 of the blank 40, sliding on the supporting plate 303 and the fastening plate 305, tend to drag and cant the blank on the conveyor 122. This tendency is overcome and the blank 40 is properly aligned with the machine by the auxiliary conveyor 215 which engages the rear edge of the top panel 57 and carries it forwardly in alignment with the rear edge of the base panel 53.

The auxiliary conveyor 215 is mounted within the operating side outer frame assembly 233, and has a drive sprocket 222 which is mounted on the end of the upper infeed sprocket shaft 204 of the main conveyor 122. The sprocket 222 is driven by the shaft 204 and is of the same diameter as the main conveyor sprockets 203 on the shaft 204, and, therefore, drives the chain 315 of the auxiliary conveyor 215 at the same speed as the speed of the chains 198 of the main conveyor 122. The chain 315 trains around an idler sprocket 316 that is fixedly mounted to a shaft 317 by a key and keyway assembly 318. The shaft 317 extends through an aperture in the web of the longitudinal frame member 109, and is journalled in a bearing assembly 319, aligned with the aperture in member 109 and fastened to the web of the frame member 109 by bolts 320, and a bearing assembly 321, fastened to the web of the longitudinal frame member 108 by bolts 322.

The upper edges of the drive sprocket 222, the idler sprocket 316, and the chain 315 of the auxiliary conveyor 215 are even with the top of the supporting plate 303 of the machine, the chain 315 traveling through a slot 323 in the supporting plate 303. The chain 315 and the chains 198 are held in alignment with the top of the supporting plate 303 by a number of spaced transverse guide elements (not shown) which support the upper length of the chain. The chain 315 has a number of upwardly extending abutments 324 which are aligned with the abutments 313 on the main conveyor 122, and which carry the rear edge of the top panel 57 forwardly in alignment with the rear edge of the base panel 53.

The upper panels 56–58 of the blank are held against the chain 315 and the abutments 324 by an overhead hold-down shoe 325. The hold-down shoe 325 is pivotally mounted to one of the transverse rods 326 which are over the operating side infeed outer frame assembly 233. Each of the transverse rods 326 extends between a mounting member 327, depending from the infeed guide assembly 125, and a side plate 328, fastened to the outer face of frame member 238 by bolts 329, and the transverse rods 326 are fastened to the mounting members 327 and the side plate by bolts 330. One of the transverse rods 326 extends through an aperture in each of the mounting members 331 which are fastened to the upper plate 332 of the hold-down shoe 325. A sled 333 depends from the upper plate 332, and slides along the upper face of the blank, holding the blank 40 against the chain 315 and maintaining the blank in horizontal alignment with the forming members of the machine.

The blank 40 is also held in vertical alignment with the forming members of the machine by the side guide rails 334 and 335. The side guide rail 334 has a horizontal leg 336 that is fastened to the supporting plate 302 by bolts 337, and has an upstanding inner side wall 338 which is aligned with one of the side alignment plates 269 of the magazine 223 and which contacts and guides one end of the blank 40 through the initial forming and filling operations; and the side guide rail 335 has a horizontal leg 339 that is fastened to the longitudinal fastening plate 303 by bolts 340, and has an upstanding inner side wall 341 which is aligned with the other side alignment plate 269 of the magazine 223 and which contacts and guides the other end of the blank 40 through the initial forming and filling operations. The first section 342 of the side wall 341 is tapered inwardly to guide the dropping blank into position on the apparatus for the initial forming operation.

In the initial forming operation, the tabs 72 are bent upwardly around score line 73 until they are approximately normal to the panel 58 of the blank 40. The panel 58, therefore, must be maintained in contact with the supporting plate 303, and be kept from bending upwardly with the tabs 72 during the forming operation. Therefore, the blank 40 travels under a longitudinally extending hold-down shoe 343 which extends over the panel 58 and holds it against the supporting plate 303 during the first forming operation. The hold-down shoe 343 is held over the supporting plate 303 by a bracket 344 which attaches to the side wall 341 of the side guide rail 335. Throughout most of its length, the hold-down shoe 343 is aligned with the outer side edge of panel 58. However, the outfeed end 345 of the hold-down shoe 343 angles inwardly away from the edge of the panel 58, and allows the tabs 72 to be bent upwardly easily.

The tab 72 is bent upwardly around the score line 73 by a stationary plow 346 which contacts the lower face of the tab 72 and cams it upwardly around the score line. The plow 346 extends inwardly from and is attached to the upwardly extending side wall 347 of a side guide member 348. The horizontal leg 349 of the member 346 is attached to the supporting plate 303 by bolts 350.

During this initial forming operation, the articles A are being transferred from the guide tracks 124 of the guide assembly 125 to the base panels 53 of the blank 40 by the turntables 123. The angle between the guide tracks 124 and the main conveyor 122 is such that the abutments 313 allow only the proper number of articles in each row on the base panel by momentarily stopping the movement of the articles in the track 124. The sliding frictional contact between the turntables 123 and the articles allows this momentary stoppage.

The other panels of the carton are folded around articles on the base panel 53. The side panel 55 contacts an upwardly extending plow 351 that bends the side panel 55 and its associated lower bevel panel 54 upwardly around the sides of the articles A. The plow 351 is fastened to the fastening plate 305 by bolts 352, and has a leading section 353 and a trailing section 354.

The leading section 353 has an upper wall 355 which is parallel to the main conveyor 122 and which extends angularly upwardly from the fastening plate 305. This upper wall 355 is the forming element of the leading section 353, contacting either the outer edge of the side panel 55 or the upper bevel panel 56 and camming the panels 54–58 upwardly around score line 44.

The trailing section 354 of the plow 351 continues the upward camming of the panels 54–58, and brings the side panel 55 into contact with the sides of the articles A. The upward bending of the panels is continued by the upper wall 356 of the trailing section 354 which forms a straight line projection with the upper wall 355 of the leading section 353. The upper wall 356 also angles inwardly toward the main conveyor 122 from the juncture 357 of the leading and trailing sections 353 and 354, and extends to the main conveyor 122. This construction allows the upper wall 356 to maintain contact with the inwardly moving panels during their travel by the plow 351. The outer side wall 358 of the trailing section 354 is aligned verticaly with the outer edge of the upper wall 356.

The inner side wall of the trailing section 354 assists the upper wall 355 in the upward bending of the panels, and in the placement of the side panel 55 against the sides of the articles A. The inner side wall has a leading face 360 that bends the panel 55 upwardly and inwardly toward the sides of the articles A, and a trailing face 361 that holds the panel 55 against the sides of the articles A. The leading face 360 is defined by an upper edge 362, a leading edge 363, and a trailing edge 364. The upper edge 362 is the upwardly and inwardly extending inner edge of the upper wall 356; the leading edge 363 is in the plane of the longitudinal plate 305, extends inwardly toward the conveyor 122 from the juncture 357, and is displaced angularly inwardly of the upper edge 362; and the trailing edge 364 is parallel to the path of travel of the conveyor 122 and extends angularly upwardly from the leading edge 363 on the longitudinal plate 305 to the upper edge 362.

The edge 364 forms the juncture between the leading face 360 and the trailing face 361. The trailing face 361 extends vertically downwardly from the edge 364, is parallel to the path of travel of the main conveyor 122, and holds the panels 55 against the sides of the articles A.

The side panels 55 are maintained against the sides of the articles A after the carton leaves the trailing face 361 by a side guide assembly 365. The upper longitudinal guide member 366 of the guide assembly 365 bears against the panel 55 and holds it against the sides of the articles. The guide member 366 is adjustably mounted on a number of transverse supporting members 367 by machine screws 368 which extend through transverse slots 369 in member 366 and engage threaded holes in the supporting members 367. The supporting members 367 are mounted on the longitudinal plate 305 in any convenient manner. The exact placement of the supporting member 367 on the longitudinal plate 305 will depend on the size or sizes of packages processed by the machine. However, the supporting members 367 will usually be positioned so that the inner edges of the supporting members 367 will bear against the side panel 55, aiding the upper guide member 366 in holding the panel 55 against the articles A, and the distance between the supporting members 367 will be equal to the distance between the abutments 313 on the conveyor 122, allowing a supporting member 367 usually to be adjacent a panel 55.

The panels 56-58 which are bent upwardly in alignment with side panel 55 by the plow 351 are bent over and down onto the articles A by an overhead plow 370. The leading section 371 of the plow 370 is a steel rod having a vertical member 372 that is mounted in a plate 373 which rests on the longitudinal plate 305 adjacent the outer side wall 358 of the plow 351. The vertical member 372 extends upwardly from the mounting plate 373 to a point at which it is aligned with the center of the top panel 37 and between the rows of article positions in the panel 57.

The upper edge of the vertical member 372 is joined to a horizontal member 372 having a curved portion 375, which extends inwardly over the conveyor 122, and a straight portion 376, which extends longitudinally and centrally of the conveyor 122. The horizontal member 374 contacts the central portion of the panel 57 and bends it downwardly over the articles around score lines 46 and 47.

The panels continue to be bent downwardly over the articles by the trailing section 377 of the overhead plow 370. The trailing section 377, a bar, has a lower edge 378 having a leading portion 379 and a trailing portion 380. The leading portion 379 extends angularly downwardly from its juncture with the leading section 371 so that it will cam the top panel 57 downwardly around score lines 46 and 47 until it is in position over the articles A. The trailing portion 380 maintains the upper panel 57 in position during the interlocking operation.

The overhead plow 370 is held in position over the conveyor 122 and the packages by a pair of transverse bars 381 which are fastened to the upper edge 382 of the trailing section 377 by machine screws 383. The transverse bars 381 are mounted to the frame of the machine in any suitable manner and may be adjustable to allow the overhead plow 370 to be positioned both horizontally and vertically for various sized cartons.

The leading portion 379 is assisted in its bending operation by an upper side guide assembly 384. The guide assembly 384 has a longitudinal guide member 385 which bears against the upper face of the bevel panel 56. The guide member 385 is adjustably mounted on L-shaped brackets 386 by machine screws 387 which extend through transverse slots 388 in the member 385 and through threaded apertures in the upper horizontal leg of the brackets 386. The brackets 386 are adjustably mounted on the side guide supporting members 367 by machine screws 389 which extend through vertical slots 390 in the vertical legs 391 of the brackets 386 and through threaded apertures in the outer edges 392 of the supporting members 367. This arrangement allows the upper guide assembly to be adjusted both vertically and horizontally for various size packages.

The inward pressure exerted by the upper guide assembly also assists the forming elements on the other side of the conveyor 122 in certain of the forming operations.

The first forming operation on the other side of the conveyor 122 is the separation of the locking tabs 79 from the bevel panel 50. This operation is performed by the plow 393, the downwardly biased arm 394, and the hold-down shoe 395 shown in FIGURE 12A.

The plow 393 is adjustably mounted to the supporting plate 302 by machine screws 396 which extend through transverse slots 397 in the mounting plate 398 of the plow 393. The leading surface 399 of the plow 393 extends upwardly and inwardly of its leading edge 400 and its inner side edge 401. Both edges are in the horizontal plane of the supporting plate 302. This construction allows the surface to bend the bevel panel 50 upwardly around score line 41.

The adjacent side panel 51 is held against the supporting plate 302 and is prevented from bending upwardly with the bevel panel 50 by the hold-down shoe 395. The hold-down shoe depends from an overhead supporting member 402. This member is fastened to the supporting plate 302 by posts 403 and to an article side guide 404 by bolts 405 which extend through apertures in a vertical leg 406 of the member 402. The supporting member 402 has a pair of slots 407 extending transversely of the machine in which machine screws 408 are slidably mounted. The machine screws 408 extend through threaded apertures in the hold-down shoe 395, and allow the shoe to be adjusted transversely of the machine and to be locked in place on the machine.

The hold-down shoe 395 has an outwardly extending post 409 rigidly mounted to it above the plane of the upper face of the plow 393. The arm 394 is pivotally mounted on the outer end of the post 409 by a bearing ring 410, and has a trailing end 411 that is downwardly biased toward the supporting plate 302 by a tension spring 412 that extends between the upper end 413 of the arm 394 and a post 414 on the hold-down shoe 395. The arm 394 is aligned with the locking tabs 79 and rides across the upper face of the bevel panel 50 until it contacts a tab 79. The downward pressure of the spring 412 on the trailing end 411 of the arm 394 causes the trailing end 411 to force the tab 79 downwardly against the supporting plate 302. The plow 393 is relieved at 415 beneath the trailing end 411 of the arm 394 to allow the tabs 79 to be separated from the bevel panel 50, and the inner lower trailing edge 416 of the plow 393 is undercut at 417 to allow the tabs 79 to pass beneath the plow.

Following this operation, the side panel 51 contacts an inwardly and upwardly extending plow 418 that bends the side panel 51 and its associated bevel panels 50 and 52 upwardly around score lines 43 and 42 until the lower bevel panel 52 and the side panel 51 contact the sides of the articles A. The trailing edge 419 of the article guide 404 is beveled inwardly to allow the upward bending of the panels, and the trailing edge 420 of the plow 418 is adjacent the conveyor 122 and parallel to the path of travel of the conveyor and holds the side panel 51 against the sides of the articles A.

The side panel 51 is maintained against the sides of the articles A during its travel through the remainder of the machine by a side guide assembly 421, similar in construction to the side guide assembly 365, having an upper longitudinal guide member 422 that is adjustably mounted on transverse supporting members 423. The placement of the supporting members 423 is the same as the placement of the supporting members 367 and the inner edges of the supporting members 423 provide additional support for the side panels 51.

The upper longitudinal guide member 422 supports the stationary interlocking elements of the machine. The first of these elements, a plow 424, is attached to the inner edge of a bracket 426 by screws 427, and extends downwardly of the bracket 426. The bracket extends over the guide member 422 and is fastened by machine screws 428 to an upwardly extending supporting member (not shown) on the guide member 422.

The plow 424 performs a number of functions—further separating the tabs 79 from the panel 50, opening the reinforcing aperture 74, and camming the reinforcing tab 72 into the reinforcing aperture 74. The separation of the tabs 79 from the panel 50 is performed by the leading section of the plow 424. This section is divided into an upper segment 429 which is bent outwardly away from the conveyor 122 and a lower segment 430 which is bent inwardly toward the conveyor 122. The upper segment 429 contacts the outer face of the panel 50 and carries it inwardly along the inner face of the plow 424; and the lower segment 430 contacts the inner face of the tab 79 and carries it outwardly along the outer face of the plow 424. The leading edge of the lower segment 430 trails the leading edge of the upper segment 429, allowing the upper segment 429 to contact the panel 50 and to carry it inwardly around the lower segment 430.

This separation of the tabs 79 from the panel 50 also opens the reinforcing apertures 74. The apertures 74 continue to be opened by the lower edge 431 of the plow 424 which contacts the upper face of the panel 50 and guides the panel downwardly against the articles A. The leading edge of the lower segment 430 is curved to guide the panels 50 beneath the lower edge 431.

The open apertures 74 have the reinforcing tabs 72 guided into them by the inner face of the plow 424. This inner face contacts the outer faces of the downwardly bent tabs 72, and causes the tabs 72 to slide downwardly into the apertures 74.

The tab 72 is further inserted into the aperture 74 by a downwardly extending plow 432 which extends over the path of travel of the carton, contacts the upper bevel panel 58, and cams the panel 58 downwardly against the bevel panel 50 and the associated tab 72 into the aperture 74. The plow 432 is fastened by screws 433 to transverse rods 434. These rods are supported by the longitudinal guide member 422 in any suitable manner.

The engagement of panel 58 with panel 50 and of the reinforcing tabs 72 with the reinforcing apertures 74 is completed by a pair of stationary rollers 435 that are rotatably mounted on shafts 436. The shafts 436, which hold the rollers 435 over the path of travel of the carton, extend into housings 437, mounted in any suitable manner to the longitudinal guide member 422. The rollers 435 bear against and are rotated by the panel 58, guiding both the panel 58 and its contiguous panel 50 downwardly against the articles A, and guiding the tab 72 into the aperture 74.

The insertion of the reinforcing tab 72 into the aperture 74 is aided by the design of the tab 72. The leading corner of the tab has a large radius of curvature which allows the tab to slide downwardly and rearwardly into the aperture 74 when it is guided downwardly by the plows 424 and 432 and the roller 435.

The insertion of the reinforcing tab 72 into the reinforcing aperture 74 aligns the locking tabs 79 with the locking apertures 70. The tab 79 is placed over the aperture 78 by the inner edge 438 of a stationary plow 439. The outer face of the locking tab 79 contacts the inner edge 438 and the tab is bent inwardly over the bevel panel 58 and the aperture 70 by the inner edge 438. The tab is held against the bevel panel 58 by the lower edge 440 of the plow 439.

A reciprocating locking member 441, adjacent to and rearwardly of the plow 439, guides the locking tab 79 through the locking aperture 70, locking the ends of the blank 40 together. The reciprocating locking member 441 has a downwardly extending punch 442 which is fastened by machine screws 443 to a slidable mounting member 444. The narrow central section 445 of the slidable mounting member 444 extends into a radial slot 446 on a rotating wheel 447, and is held within the slot by an outer locking section 448 which is wider than the slot 446, and an inner plate 449 which is also wider than the slot 446 and which is fastened to the front face of the central section 445, between the central section 445 and the punch 442, by the screws 443.

The locking member 441 is biased radially inwardly toward the center of the wheel 447 by a tension spring 450 which extends between a post 451 on the plate 449 and a post 452 on a central plate 453, which is fastened to the wheel 447 by machine screws 454 and is concentric with the wheel 447.

The locking member 441 is forced radially outwardly of the wheel 447 and downwardly into the locking position by a stationary cam 455. The cam has a horizontal supporting plate 456 on its rear face which is fastened to the horizontal supporting plate 457 and the vertical legs 458 of a supporting member 459 by machine screws 460. The machine screws 460 may extend through vertical slots in the vertical legs 458 allowing the cam 455 to be raised or lowered. The supporting member 459 is mounted on the guide member 422 by bolts 461 which extend through transverse slots 462 in the lower mounting plate 463 of the supporting member 459, and through longitudinal slots (not shown) in the guide member 422. These slots allow the cam 455 to be adjusted inwardly and outwardly from the conveyor 122 and forwardly or rearwardly of the conveyor 122 so that the cam may at all times be aligned with the rotary wheel 447. The cam 455 is concentric with the rotary wheel 447, having a central sleeve 464 and a central bearing member 465 in which the rear shaft 466 of the rotary wheel 447 is journalled.

The outer edge 467 of the cam 455 is engaged by a cam follower 468 which is rotatably mounted on the rear face of the slidable mounting member 444 by a machine screw 469. The cam follower 468 is biased inwardly against the outer edge 467 by the tension spring 450, and is maintained in an inner position through most of the arc in which they travel by the cam 455. A projection 470 on the lower edge of the cam 455 guides the locking member 441 and its punch 442 downwardly into the locking position, and upwardly from the locking position.

The reciprocating members 441 must move in timed relationship to the cartons on the main conveyor 122 so that a tab 79 will be contacted by the punch 442 on its downward stroke, and, therefore, the wheel 447 must rotate in timed relationship to the speed of the conveyor 122. The wheel 447 is rotated by a threaded shaft 471 on which the wheel 447 is fixedly mounted by a rear nut 472 and washer 473, and a front nut 474 and washer 475. The wheel 447 may be adjusted longitudinally of the shaft 471 by the clockwise or counterclockwise movement of the nuts 472 and 474.

The shaft 471 is connected to a drive shaft 476 by a coupling 477, and driven by the drive shaft 476. The shaft 476 extends through apertures in the longitudinal frame members 478 and 479, and is rotatably journalled in a bearing assembly 480, fastened to the frame member 478 by bolts 481, and a bearing assembly 482, fastened to the frame member 479 by bolts 483. The drive shaft 476 has a reversing gear 484 fixedly mounted on it between the frame members 478 and 479.

The reversing gear 484 meshes with a gear 485 which is fixedly mounted on a shaft 486. This shaft also extends through apertures in the frame members 478 and 479 and is rotatably journalled in bearing assemblies 487 and 488, the bearing assembly 487 being fastened to the frame member 478 by bolts 489 and the bearing assembly 488 being fastened to the frame member 479 by bolts 490. The gear 485 and the shaft 486 are driven by a sprocket 491 which is fixedly mounted to the shaft. A drive chain 492 is trained around the sprocket 491 and around a drive sprocket 493, which is fixedly mounted to the main conveyor drive shaft 192, and is held taut by an idler sprocket 494, which is fixedly mounted to a shaft 495. The shaft 495 is rotatably journalled in bearings 496 and 497, mounted on the frame members 478 and 479 respectively. This drive assembly allows the reciprocating locking members to be driven from the drive shaft 192 of the main conveyor 122, and, therefore, to be driven in timed relationship with the main conveyor 122.

The locking members may be adjusted for various heights of packages by an adjustment assembly. This assembly has a bar 498 pivotally mounted in the frame members 478 and 479. The bar 498 has a threaded aperture 499 through which a threaded rod 500 extends. The lower end of this rod is swivelly mounted on a horizontal post 501 that is fastened to the longitudinal frame member 108. A handle 502 on the upper end of the rod 500 allows the rod to be turned in a clockwise or counterclockwise direction, moving the bar 498 upwardly or downwardly on the rod 500. This action moves the frame members 478 and 479 upwardly or downwardly, pivoting them around the drive shaft 192 on which they are pivotally mounted by bearing assembly 503, fastened to frame member 478 by bolts 504, and bearing assembly 505, fastened to frame member 479 by bolts 506.

As may be seen, all the moving elements of the machine are operated from the motor 100 either directly or through the electric clutch 176 and the main conveyor drive shaft 192. This allows the entire machine to be operated with a few controls. These controls are grouped on the control panel 507 on the operating side of the machine, and operate the four major circuits of the machine. These are the vacuum pump control circuit 508, the motor circuit 509, the electric clutch torque control circuit 510 and the electric clutch circuit 511. Each of these circuits is operated independently of the others, although an automatic control circuit 512 to be described later will disconnect the electric clutch torque control circuit 510 and the electric clutch circuit 511 in the absence of articles A in the infeed tracks 124 or the presence of a multiplicity of blanks 40 in any one station on the conveyors 122 and 215.

The vacuum pump control circuit 508 starts and stops a vacuum pump 513, the source of vacuum for the carton blank transfer assembly 214, and protects the vacuum pump 513 from line overloads. A manual start and stop switch 514 is provided in the circuit 508. A fuse 516 protects the pump 513 against line overloads.

In the motor circuit 509, the motor 100 is in series with a normally closed off switch 517, a normally open on switch 518, and a pair of overload circuit breakers 519. The motor is started by closing the on switch 518. This action also closes a magnetic relay circuit (not shown) which maintains a closed circuit after the release of the on switch 518. The motor is stopped by depressing the off switch 517, opening the circuit 509. The depression of the on switch 517 also opens the magnetic relay circuit.

Power is transmitted from the motor 100 to the conveyors and movable locking elements of the machine through the electric clutch 176. The clutch 176, an eddy current clutch, is operated by both the electric clutch circuit 511 and the electric clutch torque control circuit 510. The electric clutch circuit 511 turns the clutch on and off, thereby starting and stopping the conveyors and the movable locking elements of the machine, and the torque control circuit 510 adjusts the torque on the clutch, thereby adjusting the speed of the movable elements of the machine. The torque adjustment adjusts the speed of the machine by adjusting the amount of direct current on the winding 520 of electric clutch 176. The current passing through the winding 520, is transferred from A.C. to D.C. by the selenium rectifier bank 521, and the amount of current going to the winding 520 is controlled by the variable potentiometer 522. The entire circuit 510 is protected against an overload by the fuse 523, and is turned on and off by an automatic switch 524 which is controlled by the central circuit 512.

The clutch 176 is turned on by closing a normally open switch 525 in the circuit 511 thereby closing the electric clutch circuit 511. This action also closes a magnetic relay 526 which maintains a closed circuit after the release of the on switch 525. A control relay 528 is also actuated by the closing of the circuit. The actuation of the control relay 528 closes the automatic switch 524 in the torque control circuit 510, thereby closing the torque control circuit. If desired, the relay 528 and the automatic switch 524 may be a single unit. The electric clutch circuit 511 may be opened and the electric clutch 176 turned off by depressing the off switch 529. This action also opens the relays 526 and 528 and their respective circuits 510 and 511.

The relays 526 and 528, and their respective circuits 510 and 511 may also be opened by a number of protective automatic on/off switches. Two such switches are shown in FIGURE 20, the blank doubling detector switch 530 and the article detector switch 531.

The switch 530 is a normally closed switch that detects the number of blanks 40 passing beneath it. If more than one thickness of blank is beneath it the switch opens, opening the relays 526 and 528 and the circuits 510 and 511. The switch 530 is best shown in FIGURES 11A and 12A. Its housing 532 is fastened by machine screws 533 to a longitudinal bar 534. The longitudinal bar 534 has a vertical leg 535 that is fastened to the guide assembly 125 by a machine screw 536 and a horizontal transverse leg 537 that is fastened to the horizontal leg 277 of the L-shaped supporting member 276. This construction maintains the toggle 538 of the switch 530 a fixed distance above the conveyor 122. This fixed distance, which is greater than the thickness of one blank and less than the thickness of two blanks, allows one blank to pass beneath the toggle 538 without touching the toggle but causes two or more blanks to engage the toggle 538 and carry it forward, opening the switch 530 and stopping the machine.

The toggle (not shown) of the normally open article detector switch 531 extends across the track 124 of the article infeed assembly 125 and is pushed from the track 124 into a closed position by the articles A passing through the track. Therefore, the switch 531 will be closed, and the electric clutch 176 and the vacuum pump 513 will operate, as long as there are articles in the track 124. If no articles are in the track 124, the switch 531 will open, stopping the electric clutch 176. Therefore, the machine will operate only if there are articles available to be packaged.

The electric clutch circuit 511, electric clutch torque control 510, and the motor circuit 509 are also protected against line overloads by the fuse blocks 539. A load control 540 is also provided.

The basic machine that has been described is adjustable for a number of variations in package size and article size. This machine may be varied further by the provision of a number of attachments which allow a number of styles of cartons to be processed.

For example, the blank may be provided with a single elongate aperture instead of the double apertures 62 and 63 of the blank shown in FIGURE 1, and certain of these apertures may be formed by inwardly extending flaps that are hingedly connected to the upper walls. Such a carton is shown in FIGURE 21. The upper panels in this carton have an elongate central aperture 90, and elongate side apertures 91. The side apertures 91 are formed by flaps 92 which are hingedly connected to the top panel 57 by a score line 93 in the web 94 between the central aperture 90 and the side aperture 91. The flaps 92 are rotated inwardly of the carton around the score lines 93, and form dividers between the rows of articles within the carton. The flaps 92 may have finger holes 95 formed by tabs 96 which are rotated inwardly of the flap 92 around score lines 97. The flaps 92 are rotated inwardly of the carton around the score lines 93 during the carton forming operation so that they may extend between the articles in the finished package formed by the machine.

The apparatus shown in FIGURES 22–29 are used to bend the flaps 92 inwardly of the top panel 57 around the score lines 93, and cause them to assume a position that is normal to the panel 57. The basic process is shown in FIGURES 22–25. As shown in these figures, a wheel 541 fixedly mounted on a shaft 542 rotates below the blank 40 in line with the flaps 92. The wheel 520 has a number of projections 543 on its outer periphery which, in their upper position, extend above the plane of the blank 40.

The rotation of the wheel 541 and the projections 543 is timed in relationship to the speed of travel of the blank 40 so that a projection 543 contacts each of the flaps 92 and rotates it upwardly as it passes overhead, and travels forwardly with the flap 92.

The upper flaps 56, 57, and 58 do not rotate upwardly with the flaps 92 because they are held against the supporting plate 303 and the longitudinal fastening plate 306 by a pair of hold-down shoes which replace the hold-down shoe 325 of the basic machine. The hold-down shoe 544 is mounted on the leading transverse rod 326 by a mounting block 545. The hold-down shoe 544 has a downwardly extending leg 546 which is fastened to the mounting block 545 by machine screws 547. The lower curved end 548 of the leg 546 rides across the top outer face of the panel 58 and holds it against the supporting plate 303. Another hold-down shoe, the shoe 549, shown in FIGURES 26–28, maintains the panel 56 against the supporting plate 303. This shoe, a sled-like member similar to the sled 333 of hold-down shoe 325, is fastened to the transverse rods 326 by mounting members 550. Both hold-down shoes are beside the rotary wheel 541, and apply downward pressure on the upper panels against the upward pressure of the projection 543 against the flap 92.

One of the projections 543 contacts the leading flap 92 and rotates it upwardly around the score line 93. The forward movement of both the flap 92 and the projection 543 carry the flap 92 into a position that is approximately at right angles to the panel 57. The lower, or forward, face of the flap 92 then contacts the lower front curved edge of an overhead plow 551 which is in the path of travel of the flaps 92 and is fastened to the hold-down shoe 549 by transverse support members 552. The continued forward movement of the blank 40 causes the lower edge of the plow 551 to rotate the leading flap 92 backwards around the score line 93 until it is contiguous with the leading wab 94.

During this operation the next projection 543 on the wheel 541 contacts the trailing flap 92 and rotates it upwardly around its score line 93 until it is approximately normal to the top panel 57 (FIGURE 23). The trailing flap is then contacted by a forwardly moving overhead abutment 553 mounted on a chain 554 which trains around sprockets 555 and 556. The abutment 553 is carried forwardly at a speed greater than the blank 40, catching the lower or rear face of the trailing flap 92 and carrying it forwardly around score line 93 until, as shown in FIGURE 24, the upper edge of the trailing flap 92 contacts the lower front curved edge of the plow 551, and the trailing flap is cammed downwardly until it is contiguous with the trailing web 94. The trailing flap 92 may overlap the leading flap 92. This 180° rotation of both the leading and trailing flaps 92 allows them to spring back to a position that is normal to the top panel 57 after the flaps move beyond the plow 551.

This operation takes place before and during the first forming operation in which the tabs 72 are bent upwardly around score lines 73, and the apparatus for this operation is driven by the auxiliary conveyor 215. The idler shaft 317a of the auxiliary conveyor 215 is the drive shaft for the present apparatus. The shaft 317a is longer than the shaft 317 of the basic machine, extending through apertures in the side plate 328 and the web of the longitudinal frame member 240. The outer end of shaft 317a is journalled in a bearing assembly 557 which is fastened to a side plate 558 by bolts 559. The side plate 558 is parallel to and spaced outwardly of the side plate 328 and is fastened to the side plate 328 by transverse mounting members 560 and machine screws 561.

A sprocket 562, fixedly mounted to the shaft 317a, drives a chain 563 which trains around a sprocket 564, fixedly mounted to the shaft 542 of the rotary wheel 541. The shaft 542 is rotatably journalled in a bearing assembly 565 which is fastened to the outer web of a longitudinal frame member 109 by bolts 566, in a bearing assembly 567 which is fastened by bolts 568 to a mounting plate 569 depending from the longitudinal stiffening member 249, and a bearing assembly 570 which is fastened to the side plate 558 by bolts 571. The shaft 542 extends through apertures in the mounting plate 569 and the side plate 558. The rotary wheel is, therefore, driven by and in timed relationship to the auxiliary conveyor 215.

The overhead abutments 553 are also driven from the idler shaft 317a of the auxiliary conveyor 215 by a reversing gear 572, fixedly mounted on a shaft 317a, which meshes with a gear 573, fixedly mounted on a shaft 574. The shaft 574 extends through apertures in the outer longitudinal frame member 240, the side plate 328, and the mounting plate 569, and is journalled in bearing assemblies 575 and 576. The bearing assembly 575 is fastened to the web of the longitudinal frame member 109 by bolts 577, and the bearing assembly 576 is fastened to the mounting plate 569 by bolts 578. A sprocket 579, fixedly mounted on the outer end of the shaft 574, drives a chain 580 which trains around a sprocket 581 fixedly mounted to a shaft 582. The shaft 582 extends through apertures in the side plates 328 and 558, and is journalled in a bearing assembly 583, fastened to the side plate 558 by bolts 584, and in a bearing assembly 585, fastened to the side plate 328 by bolts 586. The shaft 582, which has the sprocket 555 fixedly mounted to its inner end, drives the overhead abutments 553. The other upper sprocket 556 for the overhead abutments is also fixedly mounted to the inner end of shaft 587. This shaft is also journalled in a bearing assembly 588, fixedly mounted to side plate 328 by bolts 589, and in a bearing assembly 590, fixedly mounted to side plate 558 by bolts 591.

Thus both the rotary wheel 541 and the overhead abutments 553 are driven in timed relationship to the speed of the auxiliary conveyor 215.

Figure 31:
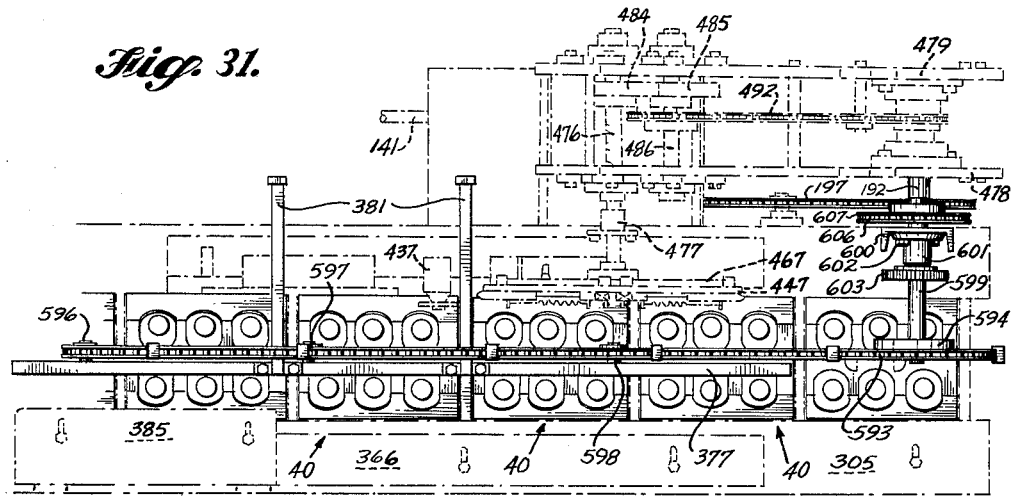
FIGURE 31 is a top plan view of the modification of FIGURE 30.
Figure 32:
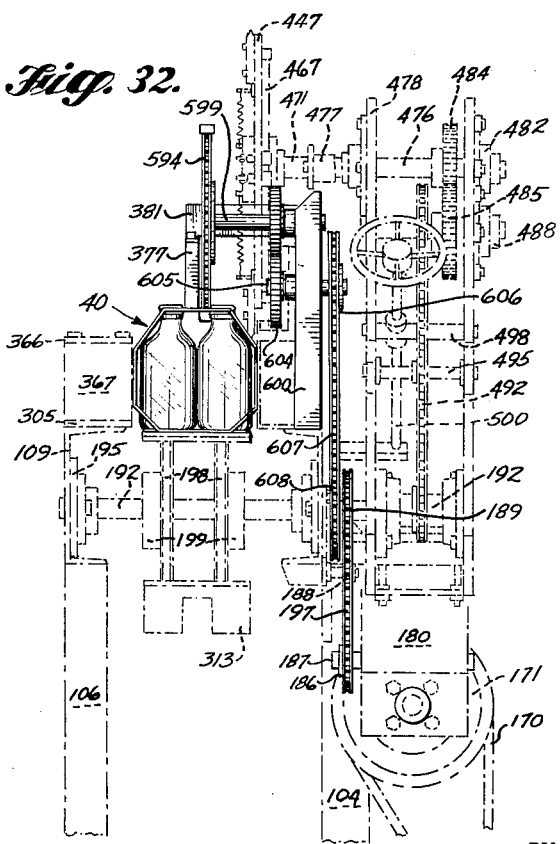
FIGURE 32 is an end elevational view of the apparatus showing the modification of FIGURE 30.

As was previously noted, the auxiliary conveyor 215 maintains a top panel 57 of the blank in alignment with the base panel 53 when the blank is in flat condition. It may also be necessary to maintain the top panel 57 in alignment with the base panel 53 during the interengaging and locking operations. This accessory shown in FIGURES 30–32 is provided for this purpose.

Again, an abutment 592 engages the rear edge of the panel 57 and carries it forwardly in alignment with the rear edge of the base panel 53. The abutments 592 are fixedly mounted on and spaced around an overhead chain 593, which trains around a drive sprocket 594 and idler sprockets 595, 596, 597, and 598. The idler sprocket 595 is mounted in any suitable manner above one of the transverse bars 381, and holds the chain 593 above both of the bars 381. The idler sprockets 596, 597, and 598 are rotatably journalled to shafts that are mounted on the trailing section 377 of the overhead plow 370, and are positioned so that the chain 593 will be even with the lower edge 378 of the trailing section 377, and the abutments 592 will extend below the lower edge 378.

The drive sprocket 594 is fixedly mounted on a drive shaft 599 which extends through an aperture in a vertical channel frame member 600 and is journalled in a bearing assembly 601 that is fastened to the frame member 600 by bolts 602. A gear 603 is also fixedly mounted to the shaft 599 and meshes with a reversing gear 604, fixedly mounted on a shaft 605. The shaft 605 extends through an aperture in the frame member 600, is journalled in a bearing assembly mounted on the frame member, and has a sprocket 606 fixedly mounted on its outer end. The sprocket 606 is engaged by a chain 607 which trains around both the sprocket 606 and a sprocket 608, fixedly mounted on the drive shaft 192 of the main conveyor 122. A suitable choice of sprocket and gear diameters maintains the overhead chain 593 and overhead abutments 592 in synchronization with the main conveyor 122 and the abutment 313.

Figure 33:
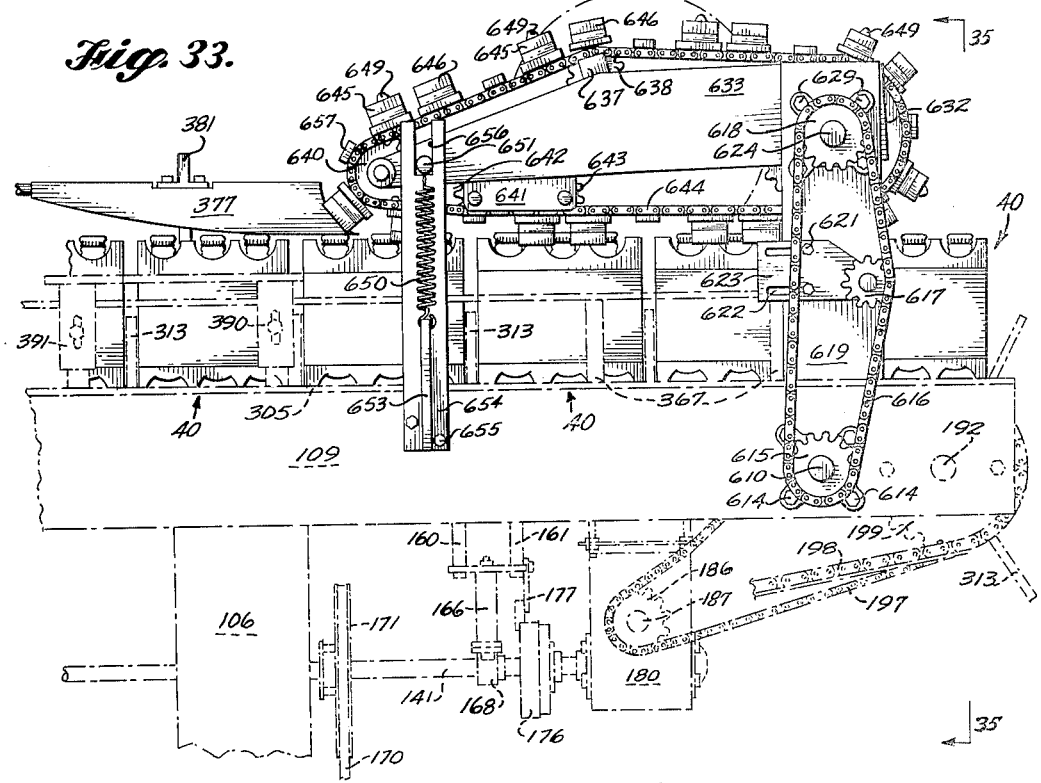
FIGURE 33 is a side elevational view of an additional conveying and forming apparatus in the carton forming and locking section.
Figure 34:
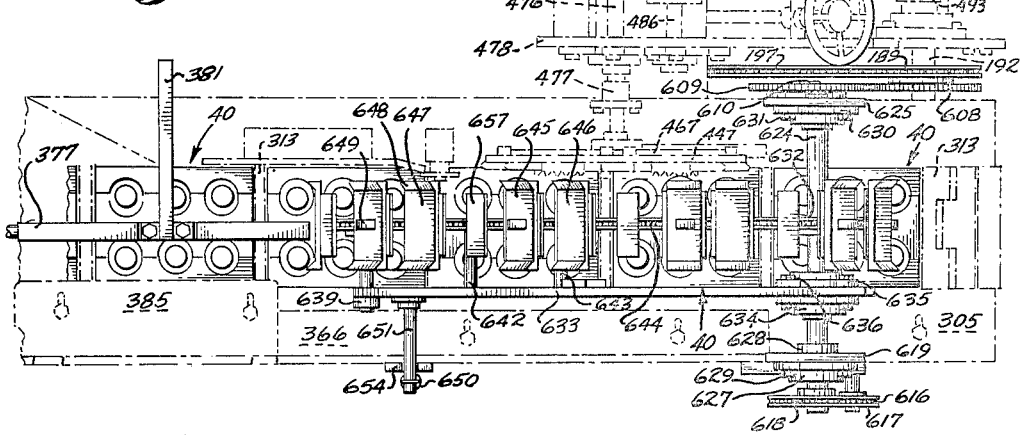
FIGURE 34 is a top plan view of the carton forming and locking section showing the modification of FIGURE 33.

It may be necessary for the overhead conveyor to positively engage the carton if there is to be a proper interlocking of the carton ends. This would be especially true of cartons of the type shown in FIGURES 1–10. The deletion of the upper score lines 47–48 from these cartons may require an overhead conveyor that will form the upper panels around the articles. Such a conveyor is shown in FIGURES 33–35.

This overhead conveyor is also operated from the drive shaft 192 of the main conveyor 122 through a reversing gear 608, fixedly mounted to the drive shaft 192, which meshes with a gear 609, fixedly mounted to a shaft 610. The shaft 610 extends through apertures in the webs of the horizontal frame members 108 and 109 and is journalled in bearing assemblies 611 and 612. The bearing assembly 611 is fastened to the web of frame member 108 by bolts 613, and the bearing assembly 612 is fastened to the web of frame member 109 by bolts 614..

A sprocket 615, which is fixedly mounted on the outer end of the shaft 610, drives a chain 616 which trains around an idler sprocket 617 and a conveyor drive sprocket 618. The idler sprocket 617 is adjustably fastened to a vertical mounting plate 619 which is mounted on the upper leg of frame member 109 and supported by gussets 620. The adjustable mounting is by screws 621 which extend through slots 622 in the mounting member 623, and allows the tension on the chain 616 to be adjusted.

The chain 616 drives the sprocket 618 of the overhead conveyor. This sprocket is fixedly mounted on a shaft 624 which extends through apertures in the vertical plate 619 and a vertical plate 625, mounted on the frame member 108 and supported by gussets 626. The shaft 624 is journalled in the bearing assemblies 627 and 628 mounted on the plate 619 by bolts 629 and the bearing assembly 630 mounted on the plate 625 by bolts 631.

The drive sprocket 632 of the overhead conveyor is fixedly mounted on the shaft 624, and the frame 633 of the overhead conveyor is rotatably mounted on the shaft 624 by bearing assemblies 634 and 635, which are fastened to the frame 633 by bolts 636. The frame 633 has a number of transverse mounting members which support the idler sprockets of the overhead conveyor. The transverse mounting member 637 supports the overhead idler sprocket 638, the forward mounting member 639 supports the forward idler sprocket 640, and the transverse mounting member 641 supports the lower idler sprockets 642 and 643. The chain 644 of the overhead conveyor trains around these sprockets and carries the forming and aligning members of the overhead conveyor into contact with the cartons and carries these members forwardly with the cartons.

Each of the forming members 645 and 646 for each carton contacts the top panels of the carton between the articles and forms the top panels around the tops of the articles. The forming of the panels is performed by a flat horizontal top portion 647 and beveled side elements 648. The juncture between the top portion 647 and the side elements 648 may be undercut for the tops of the articles A. The first forming member 645 to contact the carton has a centrally disposed spike 649 having a rounded outer end which engages the forward finger hole 65 of the carton and carries the upper panel of the carton through the interlocking operation in alignment with the base panel of the carton.

The forming members 645 and 646 are held on the carton by a tension spring 650 which extends between a post 651 on the frame 633 and an aperture 652 in a vertical transverse plate 653 mounted on an upwardly extending guide plate 654, fastened to the frame member 109 by bolts 655. The upper section of the guide plate 654 has a notch 656 in which the post 651 of the frame member 633 moves. As may be seen, this overhead conveyor substitutes for the trailing portion 380 of the trailing section 377 of the overhead plow.

Spacer elements, such as the spacer elements 657, are provided between each set of forming members 645 and 646.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A machine for forming a carton, said carton having at least one reinforcing tab and one locking aperture on one end thereof and one reinforcing aperture and one locking tab on the other end thereof, said tabs and apertures being in alignment and being interengageable, said machine comprising means for separating said locking tab from its associated wall portion and bending said associated wall portion inwardly of said locking tab, means for forming said blank into a tube with said ends overlapping each other, said forming means including means for inserting the reinforcing tab through the reinforcing aperture, means for simultaneously guiding said associated wall portion inwardly of said locking tab to open said reinforcing aperture and guiding said reinforcing tab through said reinforcing aperture, means for bending said locking tab over said locking aperture, and means for inserting said locking tab through said locking aperture.

2. A machine for forming a carton, said carton having at least one reinforcing tab and one locking aperture on one end thereof and one reinforcing aperture and one locking tab on the other end thereof, said tabs and apertures being in alignment and being interengageable, said machine comprising means for bending said reinforcing tab inwardly of its associated wall portion, means for separating said locking tab from its associated wall portion and bending said latter associated wall portion inwardly of said locking tab, means for forming said blank into a tube with said ends overlapping each other, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for bending said locking tab over said locking aperture, and means for inserting said locking tab through said locking aperture.

3. A machine for forming a carton, said carton having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for transferring blanks from said blank storing means to said blank conveying means, means for conveying said blanks through said machine, means for separating said locking tab from its associated wall portion and bending said associated wall portion inwardly of said locking tab, means for forming said blank into a tube with said ends overlapping each other, said forming means including means for inserting the reinforcing tab through the reinforcing aperture, means for simultaneously guiding said associated wall portion inwardly of said locking tab to open said reinforcing aperture and guiding said reinforcing tab through said reinforcing aperture, means for bending said locking tab over said locking aperture, and means for inserting said locking tab through said locking aperture.

4. A machine for forming a carton, said carton having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for conveying said blanks through said machine, means for transferring blanks from said blank storing means to said blank conveying means, means for bending said reinforcing tab inwardly of its associated wall portion, means for separating said locking tab from its associated wall portion and bending said latter associated wall portion inwardly of said locking tab, means for forming said blank into a tube with said ends overlapping each other, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for bending said locking tab over said locking aperture, and means for inserting said locking tab through said locking aperture.

5. A machine for forming a package of discrete articles, said package comprising a carton formed from a blank having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for conveying said blanks and said associated articles through said machine, means for transferring blanks from said blank storing means to said blank conveying means, means for frictionally guiding said articles onto said blank, means for separating said locking tab from its associated wall portion and bending said associated wall portion inwardly of said locking tab, means for forming said blank into a tube with said ends overlapping each other, said forming means including means for inserting the reinforcing tab through the reinforcing aperture, means for simultaneously guiding said associated wall portion inwardly of said locking tab to open said reinforcing aperture and guiding said reinforcing tab through said reinforcing aperture, means for bending said locking tab over said locking aperture, and means for inserting said locking tab through said locking aperture.

6. A machine for forming a package of discrete articles, said package comprising a carton formed from a blank having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for conveying said blanks and said associated articles through said machine, means for transferring blanks from said blank storing means to said blank conveying means, means for bending said reinforcing tab inwardly of its associated wall portion, means for frictionally guiding said articles onto said blank, means for separating said locking tab from its associated wall portion and bending said latter associated wall portion inwardly of said locking tab, means for forming said blank into a tube with said ends overlapping each other, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for bending said locking tab over said locking aperture, and means for inserting said locking tab through said locking aperture.

7. A machine for forming a carton, said carton having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for conveying said blanks through said machine, means for transferring blanks from said blank storing means to said blank conveying means, means for separating said locking tab from its associated wall portion and bending said associated wall portion inwardly of said locking tab, means for forming said blank into a tube with said ends overlapping each other, said tube having an upper panel and a lower panel, said forming means including means for inserting the reinforcing tab through the reinforcing aperture, means for simultaneously guiding said associated wall portion inwardly of said locking tab to open said reinforcing aperture and guiding said reinforcing tab through said reinforcing aperture, means for guiding said upper panel through said machine in alignment with said lower panel, means for bending said locking tab over said locking aperture, and means for inserting said locking tab through said locking aperture.

8. A machine for forming a carton, said carton having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for conveying said blanks through said machine, means for transferring blanks from said blank storing means to said blank conveying means, means for bending said reinforcing tab inwardly of its associated wall portion, means for separating said locking tab from its associated wall portion and bending said latter associated wall portion inwardly of said locking tab, means for forming said blank into a tube with said ends overlapping each other, said tube having an upper panel and a lower panel, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for guiding said upper panel through said machine in alignment with said lower panel, means for bending said locking tab over said locking aperture, and means for inserting said locking tab through said locking aperture.

9. A machine for forming a package of discrete articles, said package comprising a carton formed from a blank having at least one reinforcing tab and one locking aperture on one end thereof and one reinforcing aperture and one locking tab on the other end thereof, said tabs and apertures being in alignment and being interengageable, said machine comprising means for storing a supply of flat blanks, means for conveying said blanks and said associated articles through said machine, means for transferring blanks from said blank storing means to said blank conveying means, means for bending said reinforcing tab inwardly of its associated wall portion, means for frictionally guiding said articles onto said blank, means for separating said locking tab from its associated wall portion and bending said latter associated wall portion inwardly of said locking tab, means for forming said blank into a tube with said ends overlapping each other, said tube having an upper panel and a lower panel, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for guiding said upper panel through said machine in alignment with said lower panel, means for bending said locking tab over said locking aperture, and means for inserting said locking tab through said locking aperture.

10. A machine for forming a package of discrete articles with separating elements between the said articles in at least one direction, said package comprising a carton formed from a blank having at least one reinforcing tab and one locking aperture in one end thereof and one reinforcing aperture and one locking tab on the other end thereof, said tabs and apertures being in alignment and being interengageable, said machine comprising means for storing a supply of flat blanks, means for conveying said blanks and said associated articles through said machine, means for transferring blanks from said blank storing means to said blank conveying means, means for bending said separating elements from the plane of said blank into contiguity with said blank, means for frictionally guiding said articles onto said blank, means for separating said locking tab from its associated wall portion and bending said associated wall portion inwardly of said locking tab, means for forming said blank into a tube with said ends overlapping each other, said forming means including means for inserting the reinforcing tab through the reinforcing aperture, means for simultaneously guiding said associated wall portion inwardly of said locking tab to open said reinforcing aperture and guiding said reinforcing tab through said reinforcing aperture, means for bending said locking tab over said locking aperture, and means for inserting said locking tab through said locking aperture.

11. A machine for forming a package of discrete articles with separating elements between the said articles in at least one direction, said package comprising a carton formed from a blank having at least one reinforcing tab and one locking aperture in one end thereof and one reinforcing aperture and one locking tab on the other end thereof, said tabs and apertures being in alignment and being interengageable, said machine comprising means for storing a supply of flat blanks, means for conveying said blanks and said associated articles through said machine, means for transferring blanks from said blank storing means to said blank conveying means, means for bending said separating elements from the plane of said blank into contiguity with said blank, means for bending said reinforcing tab inwardly of its associated wall portion, means for frictionally guiding said articles onto said blank, means for separating said locking tab from its associated wall portion and bending said latter associated wall portion inwardly of said locking tab, means for forming said blank into a tube with said ends overlapping each other, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for bending said locking tab over said locking aperture, and means for inserting said locking tab through said locking aperture.

12. A machine for forming a package of discrete articles with separating elements between the said articles in at least one direction, said package comprising a carton formed from a blank having at least one reinforcing tab and one locking aperture in one end thereof and one reinforcing aperture and one locking tab on the other end thereof, said tabs and apertures being in alignment and being interengageable, said machine comprising means for storing a supply of flat blanks, means for conveying said blanks and said associated articles through said machine, means for transferring blanks from said blank storing means to said blank conveying means, means for bending said separating elements from the plane of said blank into contiguity with said blank, means for bending said reinforcing tab inwardly of its associated wall portion, means for frictionally guiding said articles onto said blank, means for separating said locking tab from its associated wall portion and bending said latter associated wall portion inwardly of said locking tab, means for forming said blank into a tube with said ends overlapping each other, said tube having an upper panel and a lower panel, said forming means including means for inserting the reinforcing tab through the reinforcing aperture, means for simultaneously guiding said locking tab associated wall portion inwardly of said locking tab to open said reinforcing aperture and guiding said reinforcing tab through said reinforcing aperture, means for guiding said upper panel through said machine in alignment with said lower panel, means for bending said locking tab over said locking aperture, and means for inserting said locking tab through said locking aperture.

13. Apparatus for pivoting a rearwardly extending flap formed in a blank from the plane of said blank and into contiguity with said blank comprising blank positioning means, means on one side of said blank positioning means for contacting a face of said flap and pivoting said flap from the plane of said blank, means on the other side of said blank positioning means and movable forwardly relative to said blank positioning means for contacting said face of said pivoted flap and pivoting said flap forward with respect to said blank, and means on said other side of said blank positioning means and movable rearwardly relative to said blank positioning means for contacting said face of said pivoted flap and pivoting said flap into contiguity with said blank.

14. Apparatus for pivoting a rearwardly extending flap formed in a blank from the plane of said blank and into contiguity with said blank comprising blank positioning means, means for maintaining said blank in contact with said blank positioning means, means on one side of said blank positioning means for contacting a face of said flap and pivoting said flap from the plane of said blank, means on the other side of said blank positioning means and movable forwardly relative to said blank positioning means for contacting said face of said pivoted flap and pivoting said flap forwardly with respect to said blank, and means on said other side of said blank positioning means and movable rearwardly with respect to said blank positioning means for contacting said face of said pivoted flap and pivoting said flap into contiguity with said blank.

15. Apparatus for pivoting a rearwardly extending flap formed in a blank from the plane of said blank and into contiguity with said blank comprising means for conveying said blank past a forming station, means on one side of said conveying means for contacting a face of said flap and pivoting said flap from the plane of said blank, means on the other side of said blank positioning means and movable forwardly at a speed greater than said conveying means for contacting said face of said pivoted flap and pivoting said flap forwardly with respect to said blank, and stationary means on said other side of said blank conveying means for contacting said face of said pivoted flap and pivoting said flap into contiguity with said blank.

16. Apparatus for pivoting a rearwardly extending flap formed in a blank from the plane of said blank and into contiguity with said blank comprising blank positioning means, said means having a front side on which said blank is positioned and a rear side opposite said front side, means adjacent one of said sides of said blank positioning means for contacting a face of said flap and pivoting said flap from the plane of said blank, means adjacent the other of said sides of said blank positioning means and movable forwardly relative to said blank positioning means for contacting said face of said pivoted flap and pivoting said flap forwardly with respect to said blank, and means adjacent said other side of said blank positioning means and movable rearwardly relative to said blank positioning means for contacting said face of said pivoted flap and pivoting said flap into contiguity with said blank.

17. Apparatus for pivoting a rearwardly extending flap formed in a blank from the plane of said blank and into contiguity with said blank comprising blank positioning means, said means having a front side on which said blank is positioned and a rear side opposite said front side, means for maintaining said blank in contact with said blank positioning means, means adjacent one of said sides of said blank positioning means for contacting a face of said flap and pivoting said flap from the plane of said blank, means adjacent the other of said sides of said blank positioning means and movable forwardly relative to said blank positioning means for contacting said face of said pivoted flap and pivoting said flap forwardly with respect to said blank, and means adjacent said other side of said blank positioning means and movable rearwardly with respect to said blank positioning means for contacting said face of said pivoted flap and pivoting said flap into contiguity with said blank.

18. Apparatus for pivoting a rearwardly extending flap formed in a blank from the plane of said blank and into contiguity with said blank comprising means for conveying said blank past a forming station, said means having a front side on which said blank rests and a rear side opposite said front side, means adjacent one of said sides of said conveying means for contacting a face of said flap and pivoting said flap from the plane of said blank, means adjacent the other of said sides of said blank positioning means and movable forwardly at a speed greater than said conveying means for contacting said face of said pivoted flap and pivoting said flap forwardly with respect to said blank, and stationary means adjacent said other side of said blank conveying means for contacting said face of said pivoted flap and pivoting said flap into contiguity with said blank.

19. Apparatus for pivoting a rearwardly extending flap formed in a blank from the plane of said blank and into contiguity with said blank comprising a conveyor, a hold-down shoe above said conveyor for holding a blank in contact with said conveyor, a rotating wheel below said conveyor adjacent to and offset from said hold-down shoe, said rotating wheel having a horizontal axis of rotation and a plurality of radial projections thereon, said projections extending above the upper surface of said conveyor in their upper vertical position, a second continuous conveyor mounted above and in alignment with said first conveyor and said rotating wheel, said second conveyor extending forwardly and rearwardly of said rotating wheel, a plurality of outwardly extending projections on said second conveyor, a stationary forming plow mounted above said first conveyor and below said second conveyor adjacent the forward end of said second conveyor.

20. In a machine for forming a carton, said carton having at least one reinforcing tab and one locking aperture on one end thereof and one reinforcing aperture and one locking tab on the other end thereof, said tabs and apertures being in alignment and being interengageable, said machine comprising a conveyor, a stationary plow above said conveyor, the distance between said plow and said conveyor decreasing in the forward direction of travel of said conveyor, a vertical stationary guiding member above and adjacent one side of said conveyor, said guiding member being in alignment with said plow, the rearward edge of said guiding member having upper and lower projections thereon, said projections being offset from each other with the angle of offset being an acute angle, said lower projection extending away from the conveyor and said upper projection extending toward the conveyor.

References Cited by the Examiner

UNITED STATES PATENTS

| | | | |
|---|---|---|---|
| 2,974,454 | 3/1961 | Andre et al. | 53—48 X |
| 3,031,813 | 5/1962 | Ganz | 53—48 X |
| 3,032,945 | 5/1962 | Currie et al. | 53—48 |
| 3,108,414 | 10/1963 | Schleicher et al. | 53—48 |

FRANK E. BAILEY, *Primary Examiner.*

TRAVIS S. McGEHEE, *Examiner.*

A. E. FOURNIER, P. H. POHL, *Assistant Examiners.*